(12) United States Patent
Hiie et al.

(10) Patent No.: US 8,873,568 B2
(45) Date of Patent: Oct. 28, 2014

(54) OPTIMISING COMMUNICATIONS

(75) Inventors: Magnus Hiie, Los Altos, CA (US); Soren Vang Andersen, Luxembourg (DK); Ahti Heinla, Tallinn (EE); Silver Keskkula, Kuressaare (EE)

(73) Assignee: Skype, Dublin (IE)

( * ) Notice: Subject to any disclaimer, the term of this patent is extended or adjusted under 35 U.S.C. 154(b) by 163 days.

(21) Appl. No.: 13/618,583

(22) Filed: Sep. 14, 2012

(65) Prior Publication Data

US 2013/0016728 A1    Jan. 17, 2013

Related U.S. Application Data

(63) Continuation of application No. 12/660,081, filed on Feb. 19, 2010, now Pat. No. 8,289,979.

(51) Int. Cl.
*G06F 15/16* (2006.01)
(52) U.S. Cl.
USPC .......................................................... 370/400
(58) Field of Classification Search
None
See application file for complete search history.

(56) References Cited

U.S. PATENT DOCUMENTS

| | | | |
|---|---|---|---|
| 5,291,477 | A | 3/1994 | Liew |
| 6,301,244 | B1 | 10/2001 | Huang et al. |
| 6,782,429 | B1 | 8/2004 | Kisor |
| 6,885,874 | B2 | 4/2005 | Grube et al. |
| 7,636,789 | B2 | 12/2009 | Li et al. |
| 8,289,949 | B2 | 10/2012 | Hiie |
| 8,289,979 | B2 | 10/2012 | Hiie |
| 8,463,929 | B2 | 6/2013 | Hiie et al. |
| 2002/0174247 | A1 | 11/2002 | Shen |
| 2003/0099202 | A1 | 5/2003 | Lear et al. |
| 2003/0100326 | A1 | 5/2003 | Grube et al. |
| 2003/0101029 | A1* | 5/2003 | Drumheller ....................... 703/1 |
| 2004/0076164 | A1 | 4/2004 | Vanderveen et al. |
| 2004/0233918 | A1 | 11/2004 | Larsson et al. |

(Continued)

FOREIGN PATENT DOCUMENTS

| | | |
|---|---|---|
| GB | 2469467 | 10/2010 |
| WO | WO-0209429 | 1/2002 |

(Continued)

OTHER PUBLICATIONS

"Examination Report", GB Application No. 0906416.3, Nov. 26, 2013, 4 pages.

(Continued)

*Primary Examiner* — Sulaiman Nooristany
(74) *Attorney, Agent, or Firm* — Sonia Cooper; Jim Ross; Micky Minhas

(57) ABSTRACT

A method, system and program for routing a data stream amongst a plurality of network nodes including at least a plurality of end-user nodes. The method comprises: establishing a plurality of routes for the stream to a plurality of consuming end-user nodes, including at least one route via one or more relaying nodes; at each of a plurality of optimising nodes, executing an optimization algorithm to determine a respective routing modification by evaluating a routing criterion with respect to a collection of end-user nodes which share information with the respective optimising node and determining a change in the routing criterion that would result from one or more potential routing modifications. The different optimising nodes' collections of end-user nodes are at least partially coincident such that each optimising node can determine a different routing modification with respect to at least some of the same end-user nodes.

20 Claims, 15 Drawing Sheets

(56) References Cited

U.S. PATENT DOCUMENTS

| | | |
|---|---|---|
| 2005/0015511 A1 | 1/2005 | Izmailov et al. |
| 2005/0066339 A1 | 3/2005 | Thoen |
| 2005/0278453 A1 | 12/2005 | Cherkasova |
| 2006/0013254 A1 | 1/2006 | Shmueli et al. |
| 2006/0098664 A1 | 5/2006 | De Dona |
| 2006/0123445 A1 | 6/2006 | Sullivan et al. |
| 2006/0190615 A1 | 8/2006 | Panwar et al. |
| 2006/0268871 A1 | 11/2006 | Van Zijst |
| 2007/0130584 A1 | 6/2007 | Wolf |
| 2007/0297388 A1 | 12/2007 | Appaji et al. |
| 2008/0101368 A1 | 5/2008 | Weinman |
| 2008/0183808 A1 | 7/2008 | Salesky et al. |
| 2009/0138618 A1 | 5/2009 | Li et al. |
| 2009/0252065 A1 | 10/2009 | Zhang et al. |
| 2010/0002696 A1 | 1/2010 | Vare et al. |
| 2010/0017462 A1 | 1/2010 | Thoen |
| 2010/0121977 A1 | 5/2010 | Kontola et al. |
| 2010/0131584 A1 | 5/2010 | Johnson |
| 2010/0146108 A1 | 6/2010 | Li et al. |
| 2010/0260191 A1 | 10/2010 | Hiie et al. |
| 2010/0260192 A1* | 10/2010 | Hiie et al. ............. 370/400 |
| 2010/0262709 A1 | 10/2010 | Hiie et al. |
| 2011/0158189 A1 | 6/2011 | Kuo et al. |
| 2013/0003592 A1 | 1/2013 | Hiie |

FOREIGN PATENT DOCUMENTS

| | | |
|---|---|---|
| WO | WO-2005008524 | 1/2005 |
| WO | WO-2005009019 | 1/2005 |
| WO | WO-2007070056 | 6/2007 |
| WO | WO-2010119025 | 10/2010 |

OTHER PUBLICATIONS

"Advisory Action", U.S. Appl. No. 12/660,142, (Aug. 26, 2011), 3 pages.

"Final Office Action", U.S. Appl. No. 12/660,142, (Jun. 14, 2011), 12 pages.

"International Search Report and Written Opinion", PCT Application PCT/EP2010/054804, (Jul. 21, 2010), 17 pages.

"International Search Report and Written Opinion", PCT Application PCT/EP2010/054803, (Apr. 13, 2010), 13 pages.

"Non-Final Office Action", U.S. Appl. No. 12/660,063, (Jan. 30, 2012), 21 pages.

"Non-Final Office Action", U.S. Appl. No. 12/660,081, (Dec. 29, 2011), 21 pages.

"Non-Final Office Action", U.S. Appl. No. 12/660,142, (Dec. 21, 2011), 11 pages.

"Non-Final Office Action", U.S. Appl. No. 12/660,142, (Dec. 23, 2010), 11 pages.

"Non-Final Office Action", U.S. Appl. No. 12/660,142, (Jul. 26, 2012), 13 pages.

"Notice of Allowance", U.S. Appl. No. 12/660,063, (Jun. 12, 2012), 12 pages.

"Notice of Allowance", U.S. Appl. No. 12/660,081, (Jun. 13, 2012), 13 pages.

"Search Report", GB Application 0906410.6, (Jul. 23, 2009), 1 page.
"Search Report", GB Application 0906415.5, (Jul. 23, 2009), 1 page.
"Search Report", GB Application 0906416.3, (Jul. 27, 2009), 1 page.

Baset, Salman A., et al., "An Analysis of the Skype Peer-to-Peer Internet Telephony Protocol", *Dept. of Computer Science, Columbia University*, New York, NY, IEEE, International Conference on Computer Communications; Proceedings, IEEE, XP-031072352,(Apr. 1, 2006), 11 pages.

Luo, Chong et al., "DigiMetro—An Application-Level Multicast System for Multi-Party Video Conferencing", *IEEE Communications Society, Global Telecommunications Conference*, (2004), 6 pages.

"Notice of Allowance", U.S. Appl. No. 12/660,142, (Feb. 13, 2013), 8 pages.

"Non-Final Office Action", U.S. Appl. No. 13/615,235, Jun. 6, 2014, 20 pages.

"Notice of Allowance", U.S. Appl. No. 13/615,235, Aug. 27, 2014, 7 pages.

\* cited by examiner

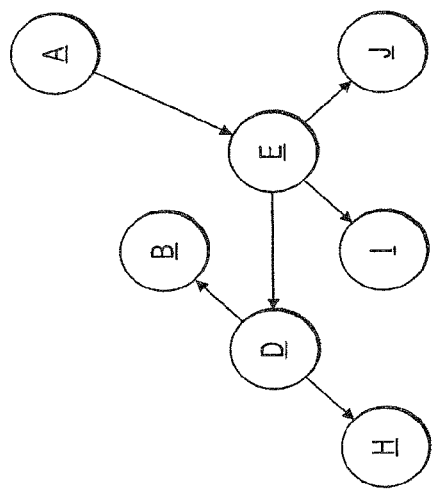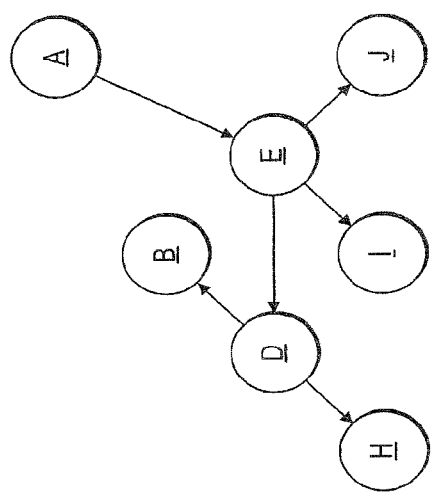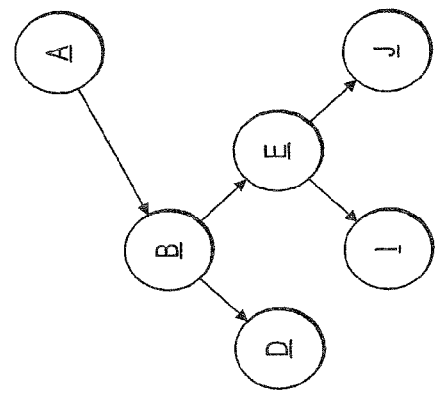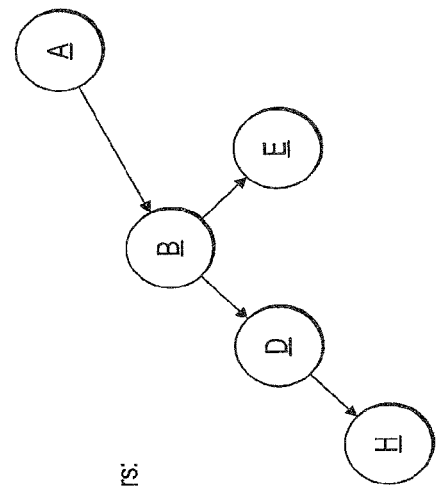
D considers:   E considers:
FIG. 13b

Current state:
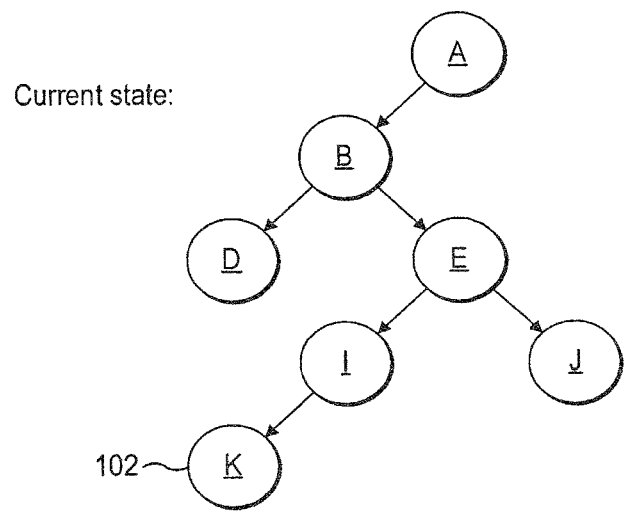
102
A proposes:
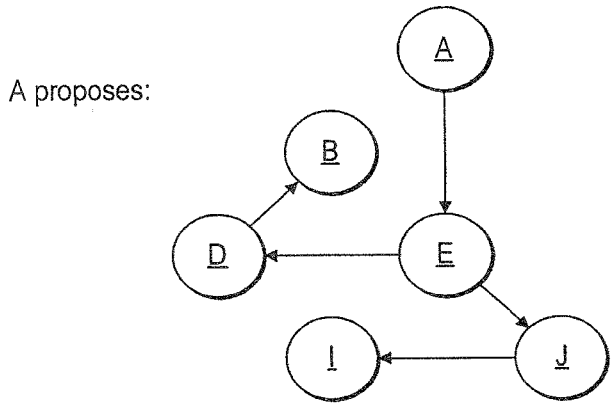
FIG. 14

OPTIMISING COMMUNICATIONS

RELATED APPLICATIONS

This application is a continuation of and claims priority under 35 U.S.C. §120 to U.S. patent application Ser. No. 12/660,081, filed on Feb. 19, 2012, which claims priority under 35 U.S.C. §119 or 365 to GB Application No. 0906410.6, filed 14 Apr. 2009, the disclosures of which are incorporated by reference herein in its entirety.

FIELD OF THE INVENTION

The present invention relates to optimising the routing of communications amongst nodes of a network including at least a plurality of end-user nodes such as peers of a peer-to-peer system.

BACKGROUND

FIG. 1 is a schematic illustration of a packet-based network such as the Internet 100, comprising a plurality of interconnected elements such as those labelled 102, 104 and 106. Each network element is connected to the rest of the Internet 100, and is configured to communicate data with other such elements over the Internet by transmitting and receiving data in the form of Internet Protocol (IP) packets. Each element also has an associated IP address locating it within the Internet. The elements shown explicitly in FIG. 1 are: a plurality of end-user terminals 102(A) to 102(E) such as desktop or laptop PCs; servers 104 and 104' of Internet-based communication systems; and a gateway 106 to another type of network such as a traditional Public-Switched Telephone Network (PSTN) or other circuit switched network. However, it will of course be appreciated that many more elements make up the Internet than those explicitly shown. This is represented schematically in FIG. 1 by a communications cloud 108 which will include many other end-user terminals, servers and gateways, as well as routers of Internet service providers (ISPs) and Internet backbone routers.

Packet-based networks such as the Internet can be used to implement a number of different types of communication between end-users, such as voice-over-IP (VoIP) calls, video-over-IP calls, instant messaging (IM) chat sessions, and file transfer. To achieve this, each of a plurality of end-users installs and executes a client application on their respective terminal 102. The client applications together with any required functionality of servers 104 or 104' form a communication system running over the Internet. Further, by communicating via a gateway 106, the system may also allow communication with other types of network such as PSTN network in order to call a conventional fixed land-line.

For example, voice-over-IP (VoIP) calls are beneficial to end-users because they are typically of significantly lower cost than fixed line or cellular mobile calls, often even free when from one VoIP client to another (rather than via a gateway 106 to another network). The cost savings may be particularly significant in the case of international or long-distance calls, since when communicating over the Internet using IP then the cost need not be dependent on distance. Similar comments may apply to video-over-IP calls.

In such communication systems, there are typically two pieces of information associated with each potential destination of a call: a user identifier (ID) which identifies the end-user, and an address which locates that user's terminal 102 within the network, in this case an IP address. That is, the user ID identifies a person whilst the address locates a terminal. Users will typically know each other's user IDs but not their address, since the user ID is typically a memorable name whereas the IP address is a long and cumbersome number. The user ID may often be referred to as the username. Further, IP addresses can sometimes change, either because they are dynamically allocated and/or because the users do not always use the same terminals, and therefore the IP address is not a reliable way for a user to indicate the intended destination of a call. For these reasons, users use each other's usernames to identify who to call. However, the IP address is the information required by the client application in order to locate the actual terminal 102 with which to establish the call. Therefore the communication system needs some means of mapping usernames to IP addresses in order to establish a call. The process of doing so is referred to as call set-up.

A similar process may apply to setting up a chat session or file transfer, and more generally the phrases "establishing a connection" or "connection set-up" may be used to cover any communication types such as voice or video calls, chat or file transfer. However, by way of example, the following will be described in terms of setting up a call.

Some Internet-based communication systems are managed by an operator, in that they rely on one or more centralised, operator-run servers 104 for call set-up. In that case, when an end-user (the caller) wishes to establish a call with another (the callee), then the caller must contact a server 104 run by the system operator to obtain the callee's IP address.

Referring to FIG. 1, consider for example that a user of a first terminal 102(A) wishes to call a user of a second terminal 102(B) using an operator managed system, with each user terminal 102(A) and 102(B) running a suitable client application. For the sake of example, the users are called "Jeremy" and "James" respectively. Jeremy indicates that he wishes to call James by specifying James' username to the client application running in his own terminal 102(A). To request the call set-up, the client application then supplies James' username from the first terminal 102(A) to the server 104. The server 104 maintains a list which maps usernames to corresponding IP addresses. Before responding to the request, the server 104 checks that Jeremy is authorised to access the list (e.g. by checking a password supplied with the request or with an earlier logon to the server 104). On condition that Jeremy is authorised, the server 104 then uses James' username to look up a corresponding IP address for the second terminal 102(B) and responds to the request by returning that IP address to the first terminal 102(A). The client application running on the first terminal 102(A) then uses the IP address to contact the second terminal 102(B) and thus establish a call therebetween, via whatever ISP and backbone routers are required.

In contrast to these operator managed systems, another type of Internet-based communication system is known as a "peer-to-peer" (P2P) network. A peer-to-peer network is an example of an overlay network, which is a network implemented at the application layer and said to be run "on top of" a lower level network such as the Internet. The idea behind peer-to-peer (P2P) networks is to devolve responsibility away from centralised operator servers and into the end-users' own terminals. In the least, it is a characterising feature of a P2P communication network that responsibility for call set-up (or more generally connection set-up) is devolved to end-user terminals like those labelled 102 in FIG. 1. Each user terminal runs a P2P client application, and each such terminal forms a node of the P2P network. P2P call set-up works by distributing a list mapping usernames to IP addresses amongst a subset of the end-user nodes, termed herein "super-nodes". The list maps the usernames of all online or recently online users to the relevant IP addresses. Each super-node acts as an IP address look-up point for a group of other local nodes, and its respective list contains the usernames and IP addresses of the nodes in that local group. The group need not necessarily be local in terms of geographical location, but rather in terms of how directly connected the nodes are to the super-node (which may be related to geographical location). Each client will monitor certain factors of its respective terminal 102 such as constancy of IP address and up-time to determine whether it should become a super-node. If so, the IP address of the super-node is advertised to the client applications running on other local nodes, and the super-node gathers the IP addresses and usernames of those local nodes for its list. Then, instead of contacting a server 104, a caller will contact a local super-node to look up the IP address of the callee. If the local super-node does not have the required IP address in its list because it is not local to the callee, then it may in turn contact another super-node which is local to the callee to determine the required address. In this way, the list mapping usernames to IP addresses is distributed amongst end-user nodes and no server is required for call set-up.

Consider again the example where Jeremy wishes to call James, but this time using a P2P network. For example, say another user terminal 102(E) happens to be the local super-node of the first terminal 102(A). Instead of contacting a server 104 to establish a call, the client of the first node 102(A) contacts the client application running on the super-node terminal 102(E). The client on the first node 102(A) then supplies James' username to the super-node 102(E), and the client on the super-node 102(E) checks whether it has the IP address of the second node 102(B). If the second node 102(B) is also a local node of the super-node 102(E), then the super-node 102(E) will have the required IP address and will return it to the first node 102(A). If on the other hand the second node 102(B) is not a local node of the super-node 102(E), then the client on the super-node 102(E) must refer to another super-node (not shown). In that case, the client on the other super-node returns the required IP address to the first nodes's local super-node 102(E), and in turn the client on that super-node 102(E) returns the IP address to the first node 102(A). The client on the first node 102(A) can then use this IP address to contact the second node 102(B) and thus establish a call therebetween, again via whatever ISP and backbone routers are required. Note that the users of the super-node terminals (e.g. Adam) are themselves end-users of the P2P network but are not personally involved in the call or its set-up in any way. That is to say, they are not participants of the call. Rather, their client applications handle the address look-up automatically.

More details of call set-up in an exemplary P2P system can be found in WO 2005/008524.

In addition to call set-up, a supplier of the P2P client application may choose to provide some additional, secondary features which in contrast to call set-up may involve a server 104'. One such function is the distribution of authentication certificates. Because call set-up is not performed via an operator server 104, then a server cannot be used to check whether a callee is in fact authorised to contact any given caller. Instead therefore, when a user first registers with the P2P system then their client application is provided with a digital certificate from a different server 104', termed herein a P2P server. This is preferably a one-time initial registration. Once the client software has been provided with the certificate, then calls or other connections can subsequently be set up and routed between users of the P2P system without the further use of a server. In particular, the users can establish their own communication routes through the P2P system based on the exchange of one or more these digital certificates (or user identity certificates, "UIC"), which enable access to the P2P system. The exchange of the digital certificates between users provides proof of the users' identities and that they are suitably authenticated in the P2P system. Therefore, the presentation of digital certificates provides trust in the identity of the user.

Further details on the use of digital certificates for authentication in an exemplary P2P system can be found in WO 2005/009019.

The P2P server 104' may also be used to provide some other secondary features in relation to a P2P network, such as to host "contact lists" (lists of users' favourite contacts), "avatar" images (chosen by the users to represent themselves graphically to others of the P2P network) and/or presence information (user-defined status information such as their location, mood and whether the user is available for communication).

Nonetheless, the primary function of call or connection set-up is still handled in a distributed fashion by end-user nodes, not by a server. Further, after initial registration, authentication preferably proceeds between end-user nodes without any further involvement of a server.

Another point of note in some P2P networks is that it may be necessary to route communications via relay nodes in order to traverse firewalls. Firewalls may only trust a limited number of nodes of the P2P network, and if the caller and callee's firewalls do not trust each other's nodes then it may be necessary to for their client applications to relay traffic via one or more other nodes of the P2P network. For example, if Jeremy wishes to call James but the firewall running on Jeremy's terminal 102(A) does not trust James' terminal 102(B) and vice versa, then they cannot communicate directly with one another even after Jeremy has retrieved James' IP address from the relevant super-node. In that case, the clients running on the first and second nodes may transmit and receive data traffic via another node such as 102(C) or 102(D) which is trusted by both Jeremy and James' firewalls. This traffic could comprise for example audio streams, video streams, file transfer streams and/or chat messages. The users of the relaying nodes (e.g. John or Harriet) are themselves end-users of the P2P network but are not personally involved in the call or the relaying process in any way, i.e. are not participants. Instead, the respective client application of the relay node handles the relaying automatically (the non-participating user will have previously agreed to such situations when installing the client application, and may themselves benefit from reciprocal situations in future). The relay node is only a relay and does not consume the stream, i.e. does not display or playback the stream in the case of video or audio streams nor store the file in the case of a file transfer stream.

The advantage of P2P networks is that they allow end-users to establish communication connections over the Internet without requiring substantial management from a network operator. Instead, they only require a supplier of a suitable client application, who may also provide certain other secondary functions from a P2P sever. Nonetheless, the inventors believe there is still potential to extend the scope of P2P networks or indeed other networks of end-user nodes. Particularly, such networks are not well suited for disseminating content such as voice, video or file transfers to a group of multiple end-user nodes. Typically they operate by establishing multiple one-to-one connections directly between the source user's node and each of the other end-user nodes in the group. This gives rise to significant resource demands at the source node, in terms of available bandwidth and processing. It would be desirable to overhaul the infrastructure of a P2P network or other network of end-user nodes in order to better provide multi-party dissemination of content.

SUMMARY

According to one aspect of the present invention, there is provided a method of routing a data stream amongst a plurality of network nodes including at least a plurality of end-user nodes, the method comprising: establishing a plurality of routes for said stream to a plurality of consuming end-user nodes, including at least one route via one or more relaying nodes; at each of a plurality of optimising nodes, executing an optimisation algorithm to determine a respective routing modification by: evaluating a routing criterion with respect to a collection of end-user nodes which share information with the respective optimising node, determining a change in the routing criterion that would result from one or more potential routing modifications, and determining whether any of said potential modifications is preferred based on the determined change, wherein the different optimising nodes' collections of end-user nodes are at least partially coincident such that each optimising node can determine a different routing modification with respect to at least some of the same end-user nodes; and when one or more of said preferred modifications is found, modifying one or more of said routes accordingly, and transmitting the stream to the consuming end-user nodes via the routes as thus modified.

Thus the optimisation is achieved by means of a distributed optimisation algorithm, preferably implemented on the end-user nodes themselves. Therefore, advantageously, there is no need for a single centralised server (e.g. 104') to perform the routing optimisation.

Said one or more relaying nodes may be end-user nodes. So according to embodiments of the present invention, the use of end-user nodes as relays need not be restricted to firewall traversal. Alternatively or additionally, the present invention may use end-user nodes to propagate a stream to multiple end-user nodes, including the possibility of routing a stream via an end-user node acting as a relay, which may also be a consumer of the stream. Thus embodiments the present invention advantageously allows the stream to be propagated throughout a network of end-user nodes, rather than relying solely on multiple one-to-one connections directly with the source node.

Said establishment of a plurality of routes may comprise establishing a set of connections amongst a group of end-user nodes, each end-user node of the group establishing a connection with at least one other of said group, so as to create said plurality of routes for said stream to a plurality of consuming end-user nodes of said group, including at least one route via one or more relaying end-user nodes of said group; and each of said collections may comprise only a sub-group of the group such that, at each of the plurality of optimising nodes, the determination of the respective routing modification may be by: evaluating the routing criterion with respect to only a sub-group of said group, and determining the change in the routing criterion with respect to the sub-group as would be affected by one or more potential routing modifications, wherein the different optimising nodes' sub-groups are at least partially coincident.

At least two of the sub-groups may contain some but not all of the same end-user nodes.

Said sub-group may comprise the end-user nodes of said group within a specified number of successive connections from the respective optimising end-user node. For example, said specified number may be two or three.

Said connections may comprise a plurality of transport connections which create said routes.

Said connections may comprise one or more additional connections not used to create routes for a stream.

The method may comprise determining said set of connections by: determining a plurality of transport connections between the end-user nodes in order to create said routes, and removing some of the transport connections from the set; wherein said sub-group comprises the end-user nodes of said group within a specified number of successive ones of said set of connections from the respective optimising end-user node.

Preferably, the actual modification of the routing is not necessarily performed whenever any improvement is found for a particular sub-group. Instead, actual modifications may only be made when certain improvements are found, dependent on the agreement of other optimising end-user nodes that the modification is acceptable from the perspective of their own respective sub-group.

Therefore in a preferred embodiment, the method may comprise: when one of said preferred modifications is found at an optimising node, communicating the preferred modification to others of said optimising nodes as a proposed modification; at each of said other optimising nodes, using the respective optimisation algorithm to determine whether the proposed modification would be acceptable according a routing criterion evaluated only with respect to its own respective collection of end-user nodes; and indicating an agreement or disagreement from said others of the optimising nodes in dependence on the respective evaluations; wherein said modification is dependent on agreement of at least one of said other optimising end-user nodes.

In further embodiments, said determination of whether the proposed modification is acceptable may comprise executing an algorithm at each of said other optimising nodes to: evaluate a routing criterion with respect to its own respective collection of end-user nodes, determine a change in the routing criterion with respect to the respective collection as would be affected by the proposed modification, and determine whether the proposed modification would be acceptable based the determined change.

The proposed modification may comprise a plurality of successive routing stages, wherein a modification to a succeeding stage can be made without affecting the routing criterion evaluated with respect to its preceding stage; and the method may comprise: at each of said other optimising nodes, using the respective algorithm to separately determine whether each successive stage of the proposed modification would be acceptable based on a routing criterion evaluated only with respect to its own respective collection of end-user nodes; and for each of the stages, indicating an agreement or disagreement from said others of the optimising nodes in dependence on the respective evaluations; wherein said modification is dependent on agreement of one or more of said other optimising nodes, such that each stage is modified only on the respective agreement of at least one of the other optimising nodes, and each succeeding stage is only modified on a further condition that its preceding stage is modified.

The proposed modification may comprise a plurality of independent parts, such that a modification according to any of the independent parts can be made without affecting the routing criterion evaluated with respect to any other of the independent parts; and the method may comprise: at each of said other optimising nodes, using the respective algorithm to separately determine whether each independent part of the proposed modification would be acceptable according a routing criterion evaluated only with respect to its own respective collection of end-user nodes; and for each of the independent parts, indicating an agreement or disagreement from said others of the optimising nodes in dependence on the respective evaluations; wherein said modification is dependent on agreement of one or more of said other optimising nodes, such that each independent part is modified only on the respective agreement of at least one of the other optimising nodes.

The optimisation algorithm may be executed dynamically at each of said optimising nodes, so as to repeat said evaluation and determination throughout transmission of the stream.

The stream may comprise one of an audio stream and a video stream. Said stream may be a stream of a live multi-party video call or voice call.

Optimising end-user nodes may comprise one or more of said consuming end-user nodes, or all of the consuming end-user nodes of said stream.

The optimising nodes may comprise a source of said stream, or all of a plurality of sources of said stream.

The optimising nodes may comprise one or more of said relaying nodes, or all of the relaying nodes of said stream.

At least one of said relaying end-user nodes may also be a consuming end-user node At least one of said relaying end-user nodes may not be a consumer of the stream it relays.

Said routing criterion may be based on an overall utility of the respective collection of end-user nodes, utility being a quantitative estimate of end-user benefit derived from consumption of the stream.

The method may be a method of routing a plurality of data streams according to any preceding claim, and may comprise: for each of said plurality of streams, establishing a plurality of routes for the stream to a plurality of consuming end-user nodes, including at least one route via one or more relaying end-user nodes, wherein at least one of the end-user nodes is a consumer and/or relay of each of a plurality of said streams.

According to another aspect of the present invention, there is provided a program product for routing a data stream amongst a plurality of network nodes including at least a plurality of end-user nodes, wherein a plurality of routes are established for said stream to a plurality of consuming end-user nodes including at least one route via one or more relaying nodes, the program comprising code which when executed on an optimising node of the network will operate in conjunction with like programs executed on other such optimising nodes to perform the steps of: at each of the plurality of optimising nodes, performing an optimisation algorithm to determine a respective routing modification by: evaluating a routing criterion with respect to a collection of end-user nodes which share information with the respective optimising node, determining a change in the routing criterion that would result from one or more potential routing modifications, and determining whether any of said potential modifications is preferred based on the determined change, wherein the different optimising nodes' collections are at least partially coincident such that each optimising node can determine a different routing modification with respect to at least some of the same end-user nodes; and when one or more of said preferred modifications is found, causing one or more of said routes to be modified accordingly, such that the stream is transmitted to the consuming end-user nodes via the routes as thus modified.

In embodiments, when executed the code may operate in conjunction with the like programs executed on other optimising nodes to additionally perform the steps of any of the above methods.

According to another aspect of the invention, there is provided a communication system for routing a data stream amongst a plurality of network nodes including at least a plurality of end-user nodes, wherein a plurality of routes are established for said stream to a plurality of consuming end-user nodes including at least one route via one or more relaying nodes, the communication system comprising a plurality of optimising nodes of said network configured so as to: at each of the plurality of optimising nodes, performing an optimisation algorithm to determine a respective routing modification by: evaluating a routing criterion with respect to a collection of end-user nodes which share information with the respective optimising node, determining a change in the routing criterion that would result from one or more potential routing modifications, and determining whether any of said potential modifications is preferred based on the determined change, wherein the different optimising nodes' collections are at least partially coincident such that each optimising node can determine a different routing modification with respect to at least some of the same end-user nodes; and when one or more of said preferred modifications is found, cause one or more of said routes to be modified accordingly, such that the stream is transmitted to the consuming end-user nodes via the routes as thus modified.

In embodiments, the optimising nodes may be further configured in accordance with any of the above methods.

According to another aspect of the present invention, there is provided a method of routing a data stream amongst a network of end-user nodes, the method comprising: establishing a set of connections amongst a group of end-user nodes, each end-user node of the group establishing a connection with at least one other of said group, so as to create a plurality of routes for said stream to a plurality of consuming end-user nodes of said group, including at least one route via one or more relaying end-user nodes of said group; at each of a plurality of optimising end-user nodes of said group, executing an optimisation algorithm to determine a respective routing modification by: evaluating a routing criterion with respect to at least a respective sub-group of the end-user nodes, determining a change in the routing criterion that would result from one or more potential routing modifications, and determining whether any of said potential modifications is preferred based on the determined change; and when one or more of said preferred modifications is found, modifying one or more of said routes accordingly, and transmitting the stream to the consuming end-user nodes via the routes as thus modified.

BRIEF DESCRIPTION OF THE DRAWINGS

For a better understanding of the present invention and to show how it may be carried into effect, reference will now be made by way of example to the accompanying drawings in which:

FIGS. 13a to 13c schematically illustrate a distributed optimisation process; and FIG. 14 schematically illustrates another distributed optimisation process.

DETAILED DESCRIPTION OF PREFERRED EMBODIMENTS

Figure 1:
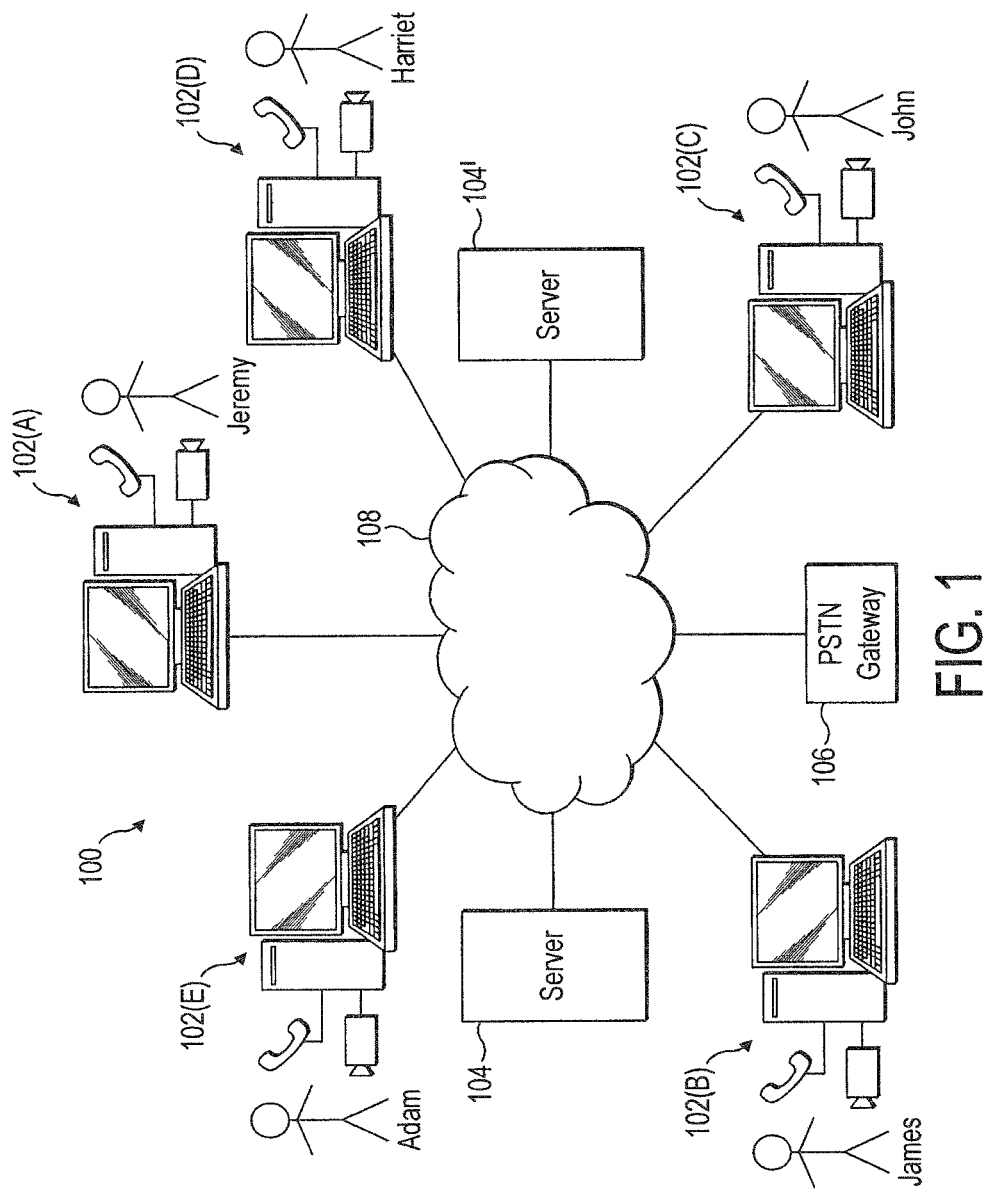
FIG. 1 is a schematic representation of a network such as the Internet.

A preferred embodiment provides a network of end-user nodes 102 running over a packet-based network such as the Internet 100, as shown schematically in FIG. 1 (ignoring the operator server 104). Each of the end-user nodes 102 is operable to establish connections with one or more others of the end-user nodes 102, thus establishing the network of end-user nodes 102. The network of end-user nodes 102 is preferably a P2P network. In accordance with the described embodiments, a data stream can be routed between end-user nodes 102 of the network, including the possibility of routing via one or more end-user nodes acting as relays, and further including the possibility that the relay nodes can themselves be consumers of the stream. The stream could be for example an audio or video stream as part of a voice or video call, or a file transfer stream. In this context, "consumption" of a stream means actually playing a decoded audio stream from a speaker for listening to by a user, displaying the decoded stream on a display for viewing by a user, or storing a file transfer stream on a storage device of the end-user node 102 for later use by a user. That is to say, consumption of a stream means acting upon the stream in a manner to achieve its ultimate intended use.

This is an example of an overlay network, which is a network implemented at the application layer. Network protocols can often be thought of as comprising a plurality of layers including (amongst others) an IP layer at a lower level of abstraction and an application layer at a higher level of abstraction ("abstraction" here means abstracted on a scale from the transmission of individual bits on the physical medium, through the transmission of multiple bits in small packets, up to the meaningful use of data as information in user applications). The IP layer only deals with individually addressed packets, whereas the application layer deals with data on a scale of multiple packets. Thus the overlay network is often described as running "on top of" a lower-level network such as the Internet 100. That is, data is packaged into packets and routed between two particular end-user nodes 102 according IP, but the overlay network makes higher-level routing decisions at the application layer by determining how to route an entire stream comprising multiple IP packets and via which end-user nodes 102. For example, the overlay network can specify that a stream is to be routed from a first end-user node 102(A) to an intermediate end-user node 102(C) and then onwards to a final end-user node 102(B). IP only deals with individually addressed packets. Therefore without additional functionality overlaid at the application layer, IP could not in itself be used to specify the route of a whole stream comprising multiple packets nor to specify a route via an intermediate end-user node.

Note again that each node 102 is an end-user node, i.e. an end-user terminal such as a desktop or laptop PC, a personal digital assistant (PDA) or a mobile phone; but not a central server of the communication system in question or a gateway. The end-user nodes are peers, each running a communication client application of the packet-based communication system and each being a potential end-point of communications implemented over that communication system.

Note also that the established connections may be wired connections or wireless, but in preferred embodiments at least the connections with relaying nodes are wired, and potentially all the established connections may be wired.

Figure 2:
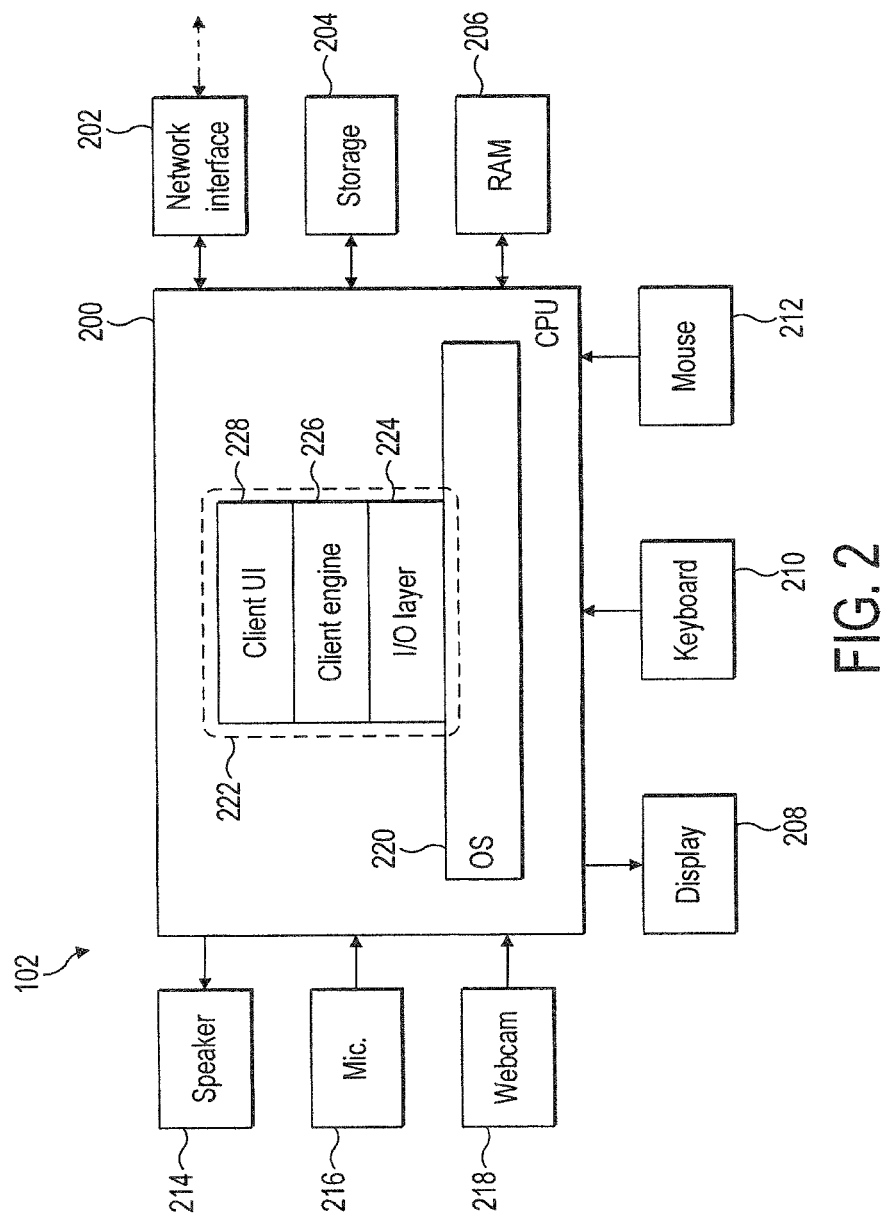
FIG. 2 is a schematic block diagram of a user terminal configured to act as a node of a network of end-user nodes running over the Internet.

The schematic block diagram of FIG. 2 shows an example of an end-user terminal 102, which is configured to act as a node of a P2P network running over the Internet. The node 102 comprises a CPU 200 operatively coupled to: a network interface 202 such as modem for connecting to the Internet 100, a non-volatile storage device 204 such as a hard-drive or flash memory, and a volatile memory device such as a random access memory (RAM) 206. The node 102 also comprises one or more user input devices, for example in the form of a keyboard 210, mouse 208, microphone 216 and webcam 218, each operatively coupled to the CPU 200. The node further comprises one or more user output devices, for example in the form of a display screen 208 and speaker 214, again each operatively coupled to the CPU 200.

The storage device 204 stores software including at least an operating system (OS) 220 and a client application 222. On start-up or reset of the node 102, the operating system software 220 is automatically loaded into the RAM 206 and from there is run by being executed on the CPU 200. Once running, the operating system 220 can then run applications such as the client application 222 by loading them into the into the RAM 206 and executing them on the CPU 200. To represent this in FIG. 2, the operating system 220 and client application 222 are shown within the CPU 200.

The client application 222 comprises three basic layers at increasing levels of abstraction above the operating system 220: an input and output (I/O) layer 224, a client engine layer 226, and a user interface (UI) layer 228. The client application 222 is on the operating system 220. This means that in a multi-tasking environment it is scheduled for execution by the operating system 220; and further that inputs to the lowest (I/O) layer 224 of the client application 222 from the input devices 202, 216 and 218 and outputs from the I/O layer 224 to the output devices 202, 208 and 214 may be mediated via suitable drivers and APIs of the operating system 220.

Within the client application 222, the I/O layer 224 is at the lowest level of abstraction: it comprises audio and/or video codecs which receive incoming encoded streams and decodes them for output to speaker 214 and/or display 208 as appropriate, and which receive unencoded audio and/or video data from the microphone 216 and/or webcam 218 and encodes them for transmission as streams to other nodes 102 of the P2P network. The I/O layer 224 may also comprises a control signalling protocol for signalling control information between nodes 102 of the network.

At the middle layer of abstraction, the client engine 226 then handles the connection management functions of the P2P network as discussed above, such as address look-up, establishing calls or connections, and authentication. The client engine may also be responsible for other secondary functions of the P2P system such as supplying up-to-date presence information and/or avatar images of the user to the P2P server 104', or retrieving up-to-date presence information and/or avatar images of other users from the P2P server 104'.

At the highest level of abstraction is the UI layer 228, which is responsible for presenting decoded video to the user via the display 208, how to arrange the presented output on the display 208 along with user controls such as buttons and menus, and receiving inputs from the user via the presented controls.

Figure 3:
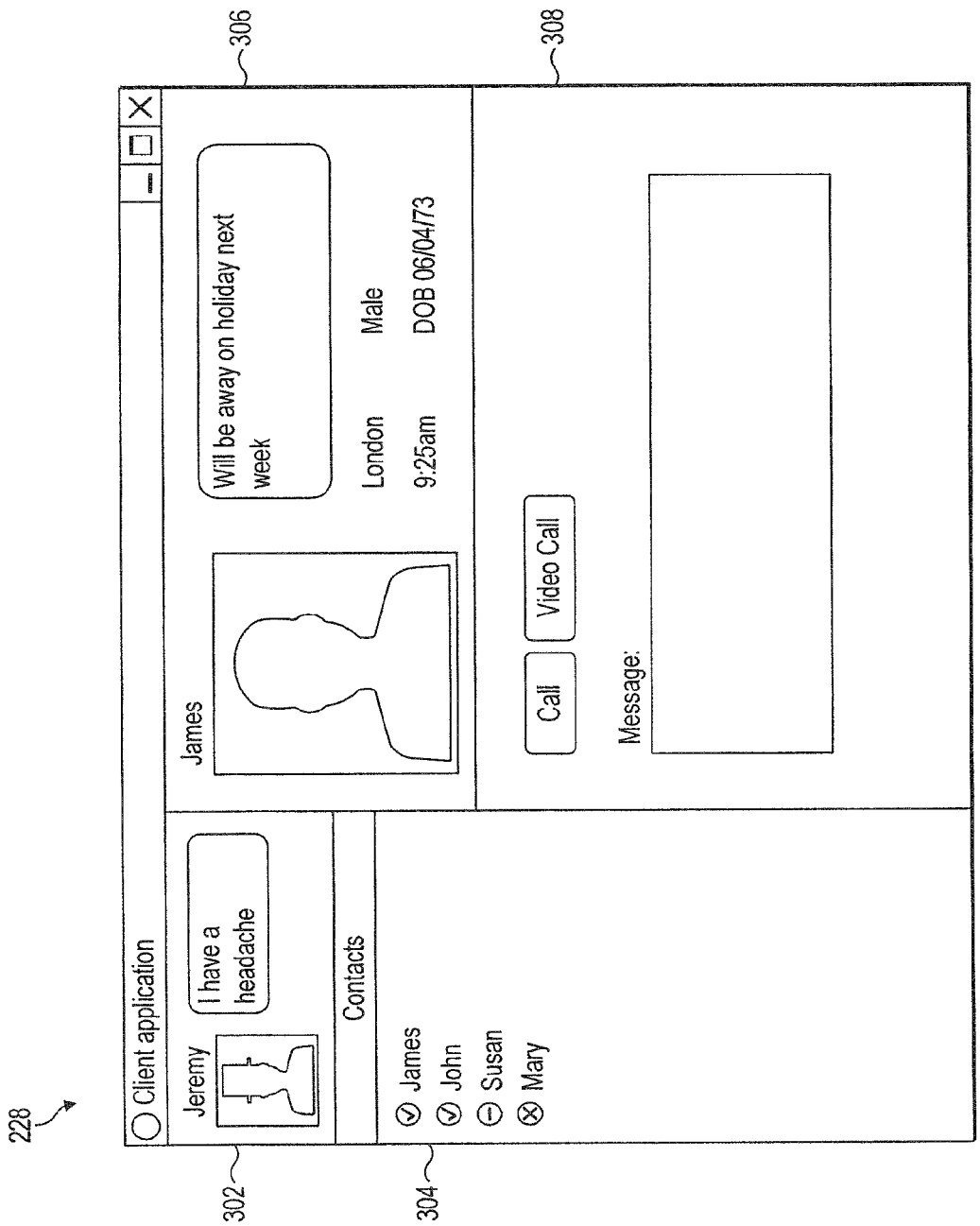
FIG. 3 is a schematic representation of a client application user interface.

FIG. 3 illustrates schematically an example user interface 228 as would be presented to a user on the display 208. In this example, the user interface 228 is that of the client 222 running on the first node 102(A). The user interface is divided into a number of panels. A first panel 302 displays some details of the user's own profile, in this example the user's name "Jeremy", an avatar image, and a "mood message". These details may be stored at and retrieved from the P2P server 104' by the client engine 226, so as to be made available to other users of the P2P network. The avatar image is an image chosen by the user to represent themselves to other users (which need not necessarily be a photo of themselves). The mood message is a brief user-defined statement which can be used for any purpose but is typically used to express how the user is feeling, news about recent events in the user's life, or any upcoming plans that may affect the user's availability. When other users view Jeremy's profile in their own clients, these details will be visible to them via the P2P server 104'.

A second panel 304 of the user interface 228 displays a contact list of the user's friends or associates, these being other users of the P2P network. The contact list may be stored at and retrieved from the P2P server by the client engine 226, so that the same list is available to the user if running a client 222 on different terminals. Presence information is also displayed in the panel next to each contact. The presence information represents a user-defined availability status. In the example illustrated, the user Jeremy has four contacts: James and John, users of the second and third nodes 102(B) and 102(C) respectively; and Susan and Mary, users of other nodes of the P2P network (not explicitly shown). Note that Jeremy need not necessarily have other user such as Harriet and Adam as contacts in order to user their nodes 102(D) or 102(E) as relays or super-nodes (although that possibility is not excluded). In this example, James and John are online and available, Susan is online but has specified that she is not available, and Mary is offline.

A third panel 306 of the user interface 228 displays the profile of a selected user from the contact list, in this case James. The displayed profile includes James' name, avatar image and mood message, along with other details James may have supplied to the P2P server 104' such as current location, local time, gender and date of birth (DOB). These profile details are retrieved from the P2P server 104' by the client engine 226.

A fourth panel 308 of the user interface 228 then displays communication controls in relation to the selected contact, such as buttons allowing a voice or video call to be established, and a window for entering chat messages. Any incoming chat messages and chat history will be displayed in this panel also, and file transfers may be established by dragging-and-dropping files into the chat window.

In accordance with the preferred embodiments of the present invention, the user may establish communications such as voice calls, video calls, file transfers or chat sessions with a group of users by selecting multiple other users from the contact list. In that case, according to the preferred embodiments, the data stream in question can be routed via one or more end-user nodes 102 acting as relays to one or more other end-nodes 102, and the relay nodes themselves may or may not be consumers of the stream. Given such possibilities, it would be desirable to find an optimal (i.e. preferred) route for propagating the stream amongst the end-user nodes 102, especially in the case of a stream containing a large amount of data such as audio or video streams or large file transfers.

To this end, the network comprises an optimiser. This optimiser may be implemented either on a server such as P2P server 104', or without a server via a distributed optimisation algorithm implemented in the client applications 222 of each of the end-user nodes 102. The optimiser is preferably implemented in the latter, distributed manner since this is more consistent with the P2P philosophy. An example of a distributed optimiser will be explained later. However, to initially understand the optimisation process, it may be easier to imagine a "top-down" optimiser as might be implemented on a server 104' which has knowledge of all end-user nodes 102 and the ability to instruct each of their routing behaviour.

Figure 4:
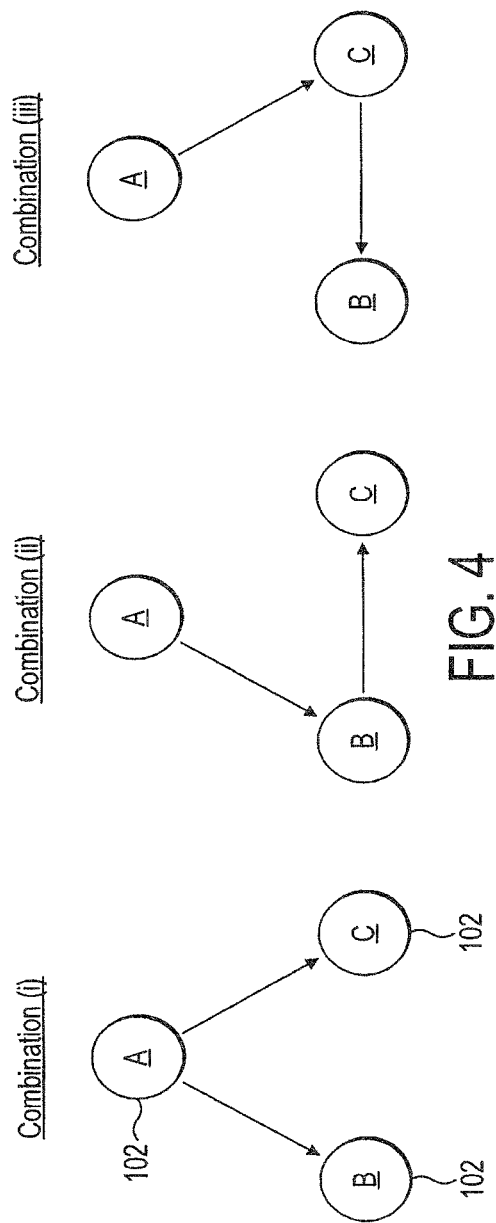
FIG. 4 is a schematic representation of a plurality of possible routing combinations.

The simplest possible optimisation problem is illustrated schematically in the example of FIG. 4. Here, a user (Jeremy) of a first node 102(A) wishes to send a stream to both a user (James) of a second terminal 102(B) and another user (John) of a third terminal 102(C), both of whom are consumers of the stream. For illustrative purposes it is assumed that these three nodes are the only nodes available in the P2P network. The goal is to find a preferred combination of routes of the stream to both James' terminal 102(B) and John's terminal 102(C). For brevity the three nodes will be referred to as A, B and C from hereon in. It will also be assumed that no firewalls block any potential connections between any of the nodes A, B or C. In this simplified example, there are only three possible solutions, as follows.

Combination (i)
Route to James: A→B
Route to John: A→C
Combination (ii)
Route to James: A→B
Route to John: A→B→C
Combination (iii)
Route to James: A→C→B
Route to John: A→C (The idea of a route here is the idea of a particular way of getting from the source to a particular end-user node, with the paths to different end-user nodes being considered as distinct routes even if partially coincident.)

In the first combination (i), node A establishes two separate one-to-one connections with nodes B and C respectively, and transmits separate instances of the stream to nodes B and C over the respective connections. In the second combination (ii), node A establishes a connection only with node B and transmits the stream only to node B. Node B then relays the stream on to node C, as well as itself decoding the stream for consumption at node B. In the third combination (iii), node A establishes a connection only with node C and transmits the stream only to node C. Node C then relays the stream on to node B, as well as itself decoding the stream for consumption at node C. In all three combinations, the stream is thus propagated to both nodes B and C for consumption at those nodes by the respective users James and John. Note also that in this example an end-user node can be both a consumer and a relay of the stream: in combination (ii) node B is both a consumer and a relay whilst node C is only a consumer, and in combination (iii) node C is both a consumer and a relay whilst node B is only a consumer.

According to the preferred embodiments of the present invention, the optimiser determines the preferred routing combination by means of a utility based routing optimisation. To do this, the optimiser considers each of a plurality of possible routing combinations in turn, and for each possible combination assigns a utility value to each consuming end-user node. So in the example of FIG. 4, for each of the possible combinations (i), (ii) and (iii) the optimiser assigns a respective utility value for node B and a respective utility value for node C.

Note that prior to the utility calculations, some combinations of routes may be initially ruled out as impossible due to resource constraints. Resource constraints are preferably a separate consideration to utility. Generally, the term "resources" used herein may refer to uplink bandwidth, downlink bandwidth and/or available CPU processing resources of one or more nodes within a route. So if one of the nodes along a route does not have sufficient processing resources or uplink or downlink bandwidth to plausibly allow a particular combination, then that combination may be discarded as potential solution before any utility calculation is performed. Thus utility is preferably only considered if resource constraints can be satisfied. This will be discussed in more detail later in relation to FIG. 9.

The concept of utility is that of end-user benefit, in this case the end-user benefit that would be derived from the stream when consumed at an end-user's node 102. Note that the utility for a given recipient end-user is a measure of the benefit expected to be experienced at the end-user node itself, not just a general measure of throughput at a router which is generally expected to be beneficial for users but without consideration of specific end-users. Further, the utility is a measure estimating the benefit that would actually be experienced for a given route, as opposed to values such as QoS values which are merely statements of desired or requested performance and do not estimate what would actually happen under any given circumstances. Further, note that the utility is the benefit that would be experienced by consumption of the stream, e.g. by actually displaying a video stream to the user, playing an audio stream to the user, or downloading a file stream for storage. Thus a change in some property of a stream or route does not necessarily affect the utility if that change does not have a tangible effect on the end-user's actual experience of the stream.

The present invention seeks to put a quantitative measure on this end-user benefit or utility. Factors that can affect end-user utility include transport properties of the route (i.e. transmission properties), which correspond to properties of the received stream as would be received at the consuming end-user node 102 in question due to effects occurring in transport over the route. For example, these may include a packet loss rate, a delay and/or a jitter in the stream. Delay can include delay between packets, and latency (the absolute delay between the transmission and reception of the stream). Jitter is a variation in delay between packets. Another transmission property is the transport bitrate for the stream, i.e. the actual bitrate that can be achieved for the stream over a particular route.

Other factors that can affect end-user utility include physical properties of the stream's route between the source user's node 102 and the consuming end-user node 102 in question; e.g. geographical proximity between nodes 102 of the route, which is related to delay. Note however note that geographical distance may only be a crude approximation of delay, and more relevant may be proximity measures in regard to the network ("network deistance"), not the geography of the nodes. It can sometimes be better to route a stream through a relay geographically further away then a closer one, because the first relay resides in a network which has better connectivity. As an example, if making a relayed call from Estonia to China then it might sound sensible to select a node in Finland as a relay (as its close to Estonia), but in fact a big city like London might have a network (ISP) with a much better average connectivity to both Estonia and China. In that case a relay chosen there might provide better quality, even though it is geographically further away.

Other factors that can affect end-user utility include properties of the stream as transmitted from the source user's node 102, e.g. the encoded bitrate and distortion of the codec. There may also be a number of media-specific properties that are relevant, like video frame rate, video resolution, and audio sampling rate.

Based on such factors affecting end-user utility, a formula is then needed to define the utility (U) as quantitative measure so it can be used to perform meaningful calculations. Such a formula may be referred to herein as the utility function. A simple example of a utility function could be:

$$U = \text{bitrate} \times (100\% - \text{packet loss rate})$$

So as the bitrate for the stream is increased, the user's experience is increased; but as the packet loss rate of the received stream is increased, the user's experience is decreased.

Note: in the above formula, it is assumed that the transport bitrate is the same as the encoded bit rate. These may in fact be different if the route's transport is not able to deliver the coded bitrate and drops random packets, but this effect may be better modelled as a packet loss rate, as in the above formula. The transport bitrate may also be different from the encoded bitrate if the route's transport is not able to deliver the encoded bitrate but instead of dropping packets randomly uses some more sophisticated method, so that the resulting quality is better than with ordinary packet loss. This is basically a layered coding, which in a preferred implementation is considered as combinations of independent sub-streams, discussed in more detail later. More generally, bitrate can be considered as either a stream property (if fixed at the encoder); or a transport property (if considered as the achievable transport bitrate). In the latter case, the encoded bitrate of the stream may be set at the encoder to be equal to the achievable transport bitrate. The bitrate can also be modelled as a combination of these cases, e.g. by allocating a bitrate range as a property of the stream, then selecting the transport bitrate from within that range.

Remember also that the utility function is intended as a measure of the benefit derived from consumption of the stream, and the actual benefit experienced cannot rise indefinitely with bitrate nor be infinitesimally sensitive to packet loss.

For example, a loss rate or delay in an audio or video stream may cease to be tangibly noticeable to a user below a certain limit, or a bitrate above a certain limit may not needed by a particular stream.

Further, the utility may be dependent on the type of stream. For example, a file transfer stream would typically be far less sensitive to delay than a live audio or video stream in a voice or video call. Live audio and video streams may also have different sensitivities to loss and/or delay than one another, and video will typically require higher bitrate than an audio stream. Also, a voice stream may have less strict requirements than a music stream.

Further, the utility may be dependent on properties of the consuming end-user node, such as a video window size or the quality of their audio or video output devices.

Further, certain factors relevant to utility may be dependent on other such factors. For example, the distortion of a transmitted audio or video stream resulting from its codec will typically increase with it's encoded bitrate, but the delay in the same stream as received at a consuming node will decrease with the encoded bitrate. Delay may also decrease with the achievable bitrate of the route. Delay, geography and connectivity are also related.

Therefore a preferred utility function is likely to be more complicated. So for example, more generally the utility function could be written as a function (f) of: intrinsic stream properties as transmitted from source (e.g. codec, encoded bitrate); transport properties of the route that affect the stream after transmission and would be experienced when the stream is received at a consuming node (e.g. packet loss, delay, transport bitrate); and/or consumption properties at the consuming node (e.g. video window size, output equipment properties). That is:

$$U=f(\text{stream,transport,consumption})$$

The various factors discussed may be signalled to the optimiser by the relevant end-user nodes 102 for use in utility calculations.

So for example, in the second combination (ii) above, the utility of node B may be dependent on: the codec of the stream as transmitted from A, the bitrate for the stream over the route from A to B, a delay and loss in that route, and properties of the consumption of the stream by B. Similarly, the utility of node C may be dependent on: the codec of the stream as transmitted from A, the bitrate for the stream over the route from A to C via B, a delay and loss in that route, and properties of the consumption of the stream by C.

Of course, any utility function will likely be an approximation. It is unlikely to be possible to formulate an objectively flawless utility function, but that does not mean one cannot be formulated that is useful in practice. A preferred form of the utility function can be obtained by computer modelling of the network in question.

As mentioned, the optimiser considers each of a plurality of possible routing combinations, and for each possible combination assigns a utility value to each consuming end-user node. So in the example of FIG. 4, for each of the possible combinations (i), (ii) and (iii) the optimiser assigns a respective utility value for node B and a respective utility value for node C. For each possible routing combination, the optimiser then calculates an overall utility for that combination, preferably by summing the utilities of all consuming end-user nodes. In the example of FIG. 4, this means the optimiser calculates:

$$U_{AB,AC}=U_B|(AB)+U_C|(AC) \quad \text{(i)}$$

$$U_{ABC}=U_B|(AB)+U_C|(ABC) \quad \text{(ii)}$$

$$U_{ACB}=U_B|(ACB)+U_C|(AC) \quad \text{(iii)}$$

That is, for combination (i) the optimiser calculates the utility of node B evaluated for route AB plus the utility of node C evaluated for route AC. For combination (ii) the optimiser calculates the utility of node B evaluated for route AB plus the utility of node C evaluated for route ABC. And for combination (iii), the optimiser calculates the utility of node B evaluated for route ACB plus the utility of node C evaluated for route AC.

Note: an alternative combining function could be used instead of addition, e.g. multiplication. For example, considering two solutions with individual utilities of two streams (1, 9) and (4, 4) would determine using addition that the first solution is better (1+9=10, 4+4=8), but using a product that the second solution is better (1×9=9, 4×4=16). Which is considered to be fairer for all users may depend on implementation details and the particular system in question. For illustrative purposes, additive utility calculations will be used in the examples below.

Once the optimiser has calculated the overall utility for each of the possible routing combinations to be considered, it then selects the combination having the overall utility which represents the greatest benefit to the greatest number of consuming end-user nodes. Preferably this is done by comparing the above totals for each combination, and selecting the combination with highest total utility (assuming a higher utility represents a higher overall benefit). The optimiser then establishes the appropriate connections between the nodes A, B and C according to the selected routing combination, and causes the stream to be routed accordingly. Thus the optimiser advantageously obtains an overall picture of the system, which it can use to select the routing combination having the greatest overall benefit for all consuming end-users considered as a whole.

As also mentioned above, in embodiments the present invention may include the possibility that some end-user nodes 102 can be "pure" relays, i.e. not themselves consumers of the stream which they route. An example of this is illustrated schematically in FIG. 5, in which one extra end-user node 102(D) is introduced into the system (node D for brevity). In this example, the source user Jeremy has not selected to share the stream with the user of node D, Harriet. Put another way, Harriet is not a participant of the stream. Nonetheless, the optimiser may include the non-participating user's node D in the optimisation problem. In this case, the client application running on node D handles the routing autonomously, without the non-participating user Harriet being personally involved in any way (the non-participating user has previously agreed to such situations when installing the client application, and may themselves benefit from reciprocal situations in future). This then creates another six possible routing combinations which the optimiser may consider, as follows.

Combination (iv)
Route to James: A→D→B
Route to John: A→D→C
Combination (v)
Route to James: A→D→C→B
Route to John: A→D→C
Combination (vi)
Route to James: A→B
Route to John: A→B→D→C
Combination (vii)
Route to James: A→D→B
Route to John: A→D→B→D
Combination (viii)
Route to James: A→B
Route to John: A→D→C
Combination (ix)
Route to James: A→C
Route to John: A→D→B If there are no issues with firewalls, routing combinations (v) to (ix) may be ruled out as pointless. However, possible combination (iv) may potentially have a purpose, for example if node A does not have a high uplink bandwidth and so would struggle to transmit to two nodes. Therefore even if there are no firewall issues, combination (iv) may be considered by the optimiser in the optimisation problem. In combination (iv), node A establishes a connection only with node D and transmits the stream only to node D. In turn node D establishes two separate one-to-one connections with nodes B and C respectively, and relays separate instances of stream to nodes B and C over the respective connections. However, a pure relay node such as D does not consume the stream. To prevent this, the stream may be encrypted and the key required for decryption only provided to the consuming nodes such as B and C, not to pure relay nodes such as D (although nodes which are both consumers and relays are provided with the key).

In this situation, the optimiser calculates individual utility values for nodes B and C for the additional possible routing combination (iv), and then determine an overall utility for this additional possible routing combination:

$$U_{ADB,ADC} = U_B|(ADB) + U_C|(ADC) \qquad \text{(iv)}$$

That is, the optimiser calculates the utility of node B evaluated for route ADB plus the utility of node C evaluated for route ADC. But note that the optimiser does not calculate a utility for node D, since D is not a consumer of the stream.

Further, if firewalls do block certain connections between nodes, e.g. node A cannot connect directly to node B or C, then routing combinations of the types shown in (v) to (ix) may be considered by the optimiser and some others such as combination (i) ruled out.

Figure 5:
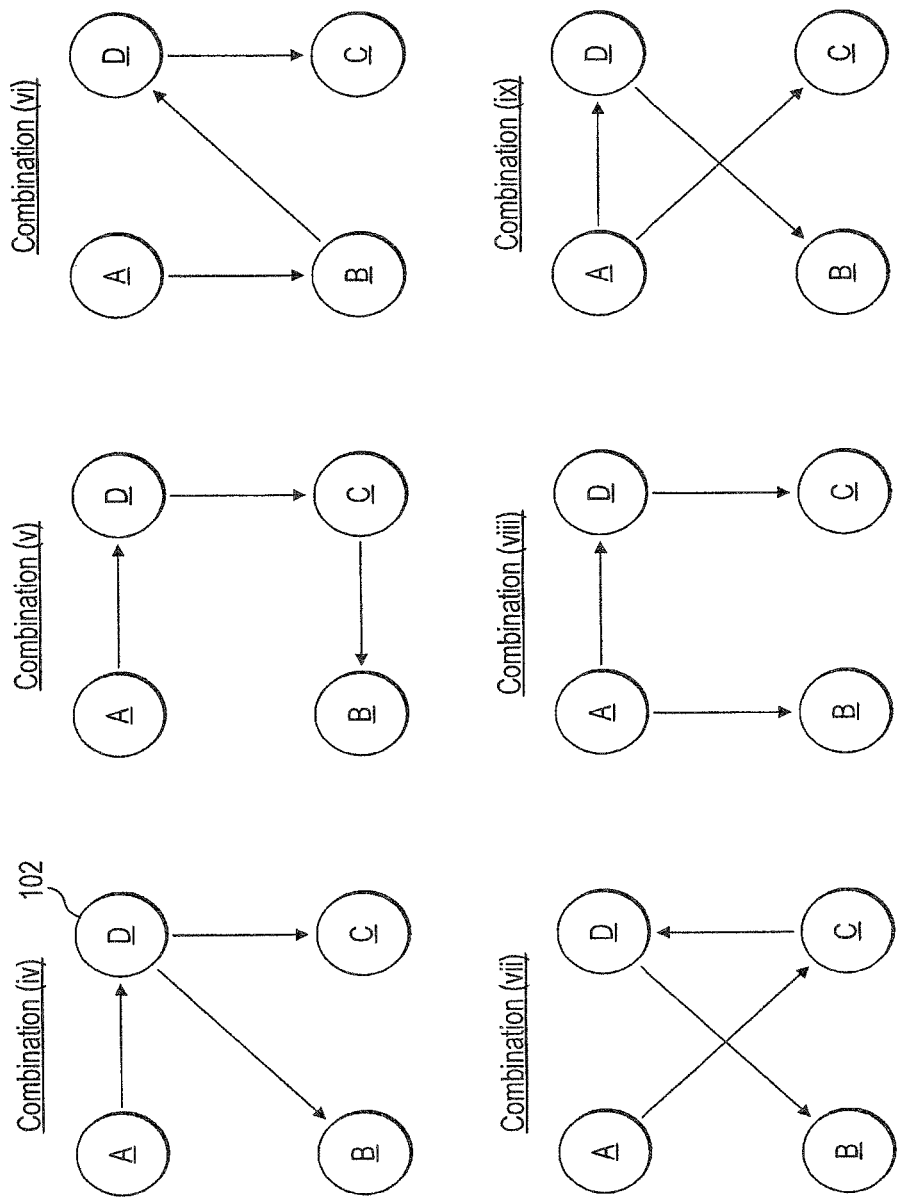
FIG. 5 is a schematic representation of a plurality of further possible routing combinations.

The examples of FIGS. 4 and 5 are simplified examples to aid understanding. In practice, the invention may be applied to propagate a stream amongst a much larger group of users than merely one source, two consumers and one additional possible relay. It will be appreciated given the disclosure herein that the same principles can apply to optimising the propagation of a stream amongst many more end-user nodes.

Furthermore, there may be multiple streams for the optimiser to take into account. In this case, the optimiser will preferably perform the optimisation for multiple streams over all consumptions of each stream. That is, for each possible routing combination, the optimiser will calculate the utility of each possible stream as consumed by each consuming end-user node of that stream.

Figure 6:
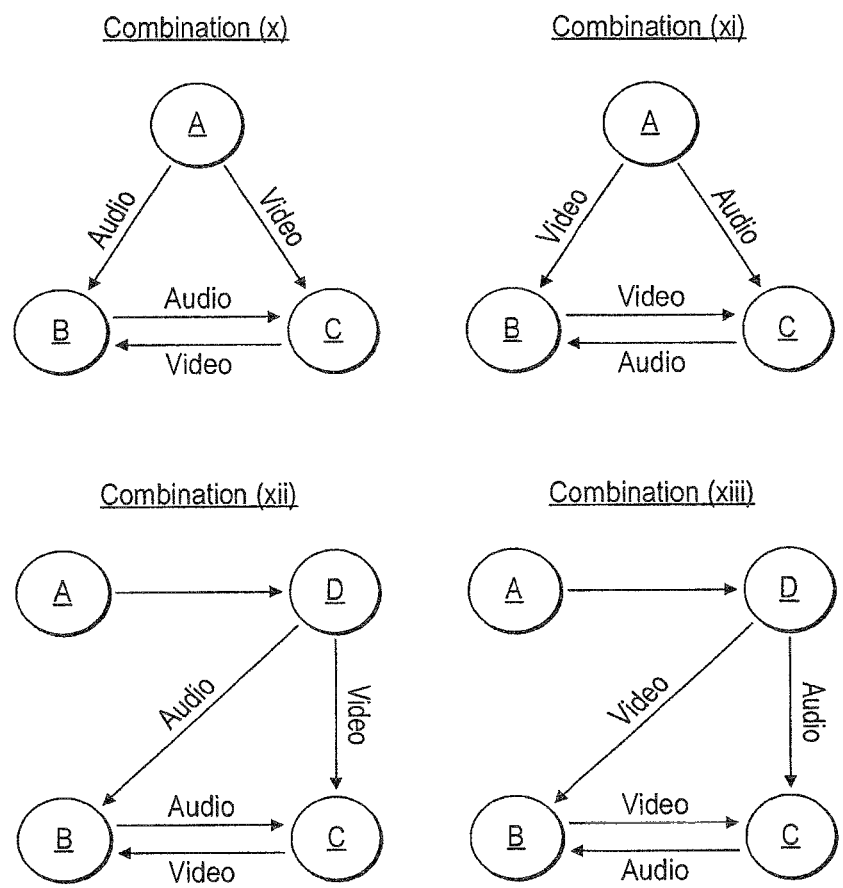
FIG. 6 is a schematic representation of a plurality of further possible routing combinations.

One example of this arises in the case of a video call, which in fact typically comprises at least two streams: a video stream and an audio stream. As illustrated schematically in FIG. 6, this creates four additional possible routing combinations which the optimiser may consider (assuming no firewall traversal is required, and that FIGS. 4 and 5 represent the combinations where the audio and video streams are sent on the same routes). These are as follows.

Combination (x)
Audio route to James: A→B
Video route to James: A→C→B
Audio route to John: A→B→C
Video route to John: A→C Combination (xi)
Audio route to James: A→C→B
Video route to James: A→B
Audio route to John: A→C
Video route to John: A→B→C Combination (xii)
Audio route to James: A→D→B
Video route to James: A→D→C→B
Audio route to John: A→D→B→C
Video route to John: A→D→C Combination (xiii)
Audio route to James: A→D→C→B
Video route to James: A→D→B
Audio route to John: A→D→C
Video route to John: A→D→B→C In the additional combinations (x) and (xi), node A establishes separate one-to-one connections with nodes B and C. In combination (x) node A transmits the audio stream on a first connection to node B and the video stream on a second connection to node C. In combination (xi), node A transmits the audio stream on the second connection to node C and the video stream on the first connection to node B. In both cases, nodes B and C also establish a connection with one another in order to share the audio and video streams between them. Both B and C are consumers of both the audio and video stream.

In the other additional combinations (xii) and (xiii), node A establishes a connection only with node D, and node D establishes separate one-to-one connections with nodes B and C. In combination (xii) node D transmits the audio stream on a first connection to node B and the video stream on a second connection to node C. In combination (xii), node D transmits the audio stream on the second connection to node C and the video stream on the first connection to node B. In both cases, nodes B and C also establish a connection with one another in order to share the audio and video streams between them. Again, both B and C are consumers of both the audio and video stream; but node D is a pure, non-participating relay and so consumes neither the audio nor the video stream.

The utilities for each stream are then:

$$U_{AB,AC}|(\text{audio}) = U_B|(AB,\text{audio}) + U_C|(AC,\text{audio})$$

$$U_{AB,AC}|(\text{video}) = U_B|(AB,\text{video}) + U_C|(AC,\text{video})$$

$$U_{ABC}|(\text{audio}) = U_B|(AB,\text{audio}) + U_C|(ABC,\text{audio})$$

$$U_{ABC}|(\text{video}) = U_B|(AB,\text{video}) + U_C|(ABC,\text{video})$$

$$U_{ACB}|(\text{audio}) = U_B|(ACB,\text{audio}) + U_C|(AC,\text{audio})$$

$$U_{ACB}|(\text{video}) = U_B|(ACB,\text{video}) + U_C|(AC,\text{video})$$

$$U_{ADB,ADC}|(\text{audio}) = U_B|(ADB,\text{audio}) + U_C|(ADC,\text{audio})$$

$$U_{ADB,ADC}|(\text{video}) = U_B|(ADB,\text{video}) + U_C|(ADC,\text{video})$$

$$U_{ADBC}|(\text{audio}) = U_B|(ADB,\text{audio}) + U_C|(ADBC,\text{audio})$$

$$U_{ADCB}|(\text{video}) = U_B|(ADCB,\text{video}) + U_C|(ADC,\text{video})$$

$$U_{ADCB}|(\text{audio}) = U_B|(ADCB,\text{audio}) + U_C|(ADC,\text{audio})$$

$$U_{ADBC}|(\text{video}) = U_B|(ADB,\text{video}) + U_C|(ADBC,\text{video})$$

For each routing combination, the optimiser then calculates the overall utility summed over all consumptions of the streams:

$$U_{tot} = U_{AB,AC}|(\text{audio}) + U_{AB,Ac}|(\text{video}) \qquad \text{(i)}$$

$$U_{tot} = U_{ABC}|(\text{audio}) + U_{ABC}|(\text{video}) \qquad \text{(ii)}$$

$$U_{tot} = U_{ACB}|(\text{audio}) + U_{ACB}|(\text{video}) \qquad \text{(iii)}$$

$$U_{tot} = U_{ADB,ADC}|(\text{audio}) + U_{ADB,ADC}|(\text{video}) \qquad \text{(iv)}$$

$$U_{tot} = U_{ABC}|(\text{audio}) + U_{ACB}|(\text{video}) \qquad \text{(x)}$$

$$U_{tot} = U_{ACB}|(\text{audio}) + U_{ABC}|(\text{video}) \qquad \text{(xi)}$$

$$U_{tot} = U_{ADBC}|(\text{audio}) + U_{ADBC}|(\text{video}) \qquad \text{(xii)}$$

$$U_{tot} = U_{ADCB}|(\text{video}) + U_{ADCB}|(\text{audio}) \qquad \text{(xiii)}$$

Finally, the optimiser compares the overall utility values for each possible combination and selects that having the greatest utility, thus representing the greatest benefit for the greatest number of users.

Note that in the case of joint optimisation of related audio and video streams, the utility function for the audio stream may be dependent on properties of the video stream and vice versa. For example, there may be little or no benefit the audio stream arriving with a much larger delay than it related video stream or vice versa.

Figure 7:
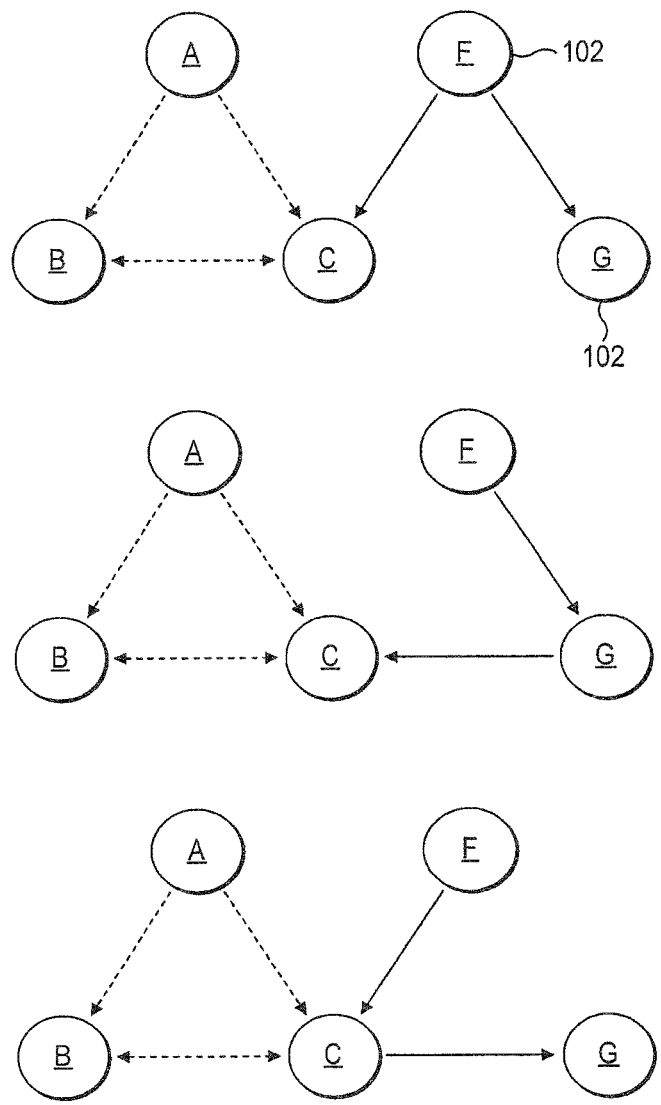
FIG. 7 is a schematic representation of a plurality of further possible routing combinations.

Another example of multiple stream optimisation occurs when one or more users are involved in multiple different unrelated streams. For example, one user could be listening to a voice call from one source whilst downloading a file from another source. An example is shown schematically in FIG. 7. Here, in addition to a first stream which is to be propagated from node A to consuming nodes B and C, as in FIG. 4, node C is also a consumer of a second, unrelated stream which is to be propagated from another node 102(F) to consuming nodes C and 102(G). Nodes 102(F) and 102(G) will be referred to as nodes F and G for brevity. For each of the three possible combinations for routing the first stream from A to B and C as shown in FIG. 4, there are three possible combinations for routing the second stream from F to C and G as shown in FIG. 7. Therefore there are nine possible routing combinations which the optimiser may consider, and these must be considered together in the same optimisation problem because node C is involved in both streams and so any routing decision regarding the first stream may affect the utility derived from the second stream and vice versa.

For each possible routing combination, the optimiser calculates the utility of each end-user node for each stream. The optimiser can then calculate the overall utility for each combination:

$$U_{tot} = U_B | (\text{stream 1, route of stream 1 to } B) + U_C |$$
$$(\text{stream 1, route of stream 1 to } C) + U_C |$$
$$(\text{stream 2, route of stream 2 to } C) + U_G |$$
$$(\text{stream 2, route of stream 2 to } G)$$

More generally, for any number of streams s=1 ... S and end-user nodes n=1 ... N, the overall utility for each combination t (i.e. topology) is:

$$U_{tot}\bigg|(t) = \sum_{n=1}^{N} \sum_{s=1}^{S} U_n \bigg|(t_{n,s})$$

Again, the optimiser compares the overall utility values for each possible combination t and selects the combination having the greatest overall utility, thus representing the greatest benefit for the greatest number of users.

Figure 8:
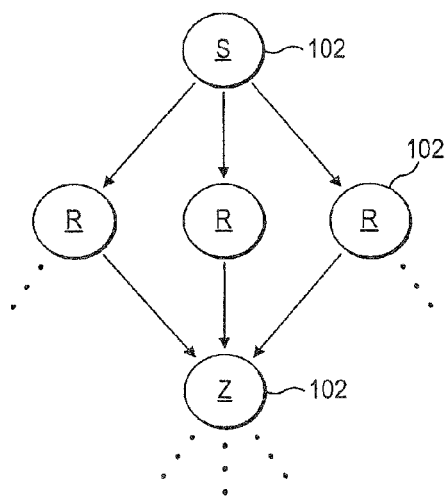
FIG. 8 is a schematic representation of another possible routing combination.

Another possibility for routing is illustrated schematically in FIG. 8. Here, the same stream having the same content may be divided into separate elements and transmitted along parallel routes via connections established with a plurality of non-consuming relay nodes 102(R) (which are again also end-user nodes). Note: these elements need not be exclusive portions, but may instead include some redundancy to allow for redundancy-enhanced derived streams rather than simple interleaving. Each element of the stream is transmitted from a source user's node 102(S) to one or more consuming user-nodes 102(Z) via a different respective relay node 102(R). This type of divided stream can be used as an option for routing to one or more consuming end-user nodes within one or more a wider routing combinations, and the optimiser will calculate the utility of each stream as consumed by each end-user node for each of a plurality of possible routing combinations and select the combination having the greatest overall utility. The portions may also in part comprise redundant data to aid in reconstruction and error correction of the stream at the consuming node.

Figure 9:
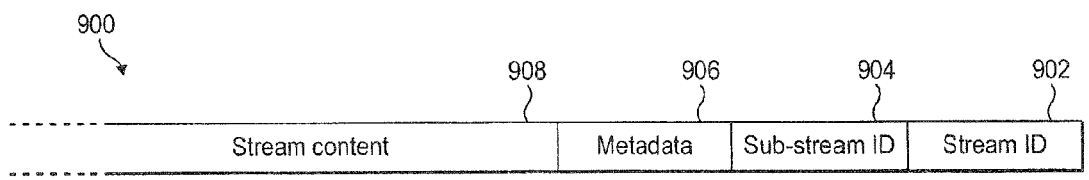
FIG. 9 is a schematic representation of a data stream.

Some additional possibilities for optimisation are discussed in relation to FIG. 9, which is a schematic representation of a data stream 900 according to a preferred embodiment of the present invention.

In addition to the stream's actual content (the audio, video or file contents), the stream 900 comprises a stream ID 902 which identifies the content of that stream and is used by the client application 222 to identify which stream is required by the user. The inclusion of a stream ID identifying the actual content advantageously allows for the possibility of publishing different instances of the same stream from different sources. Although the different instances are logically separate, they are conceptually the same stream because they contain the same content, e.g. the same TV program, speech, music or file, and are identified as such by the stream ID. The optimisation can the can then include a choice of source nodes.

Figure 10:
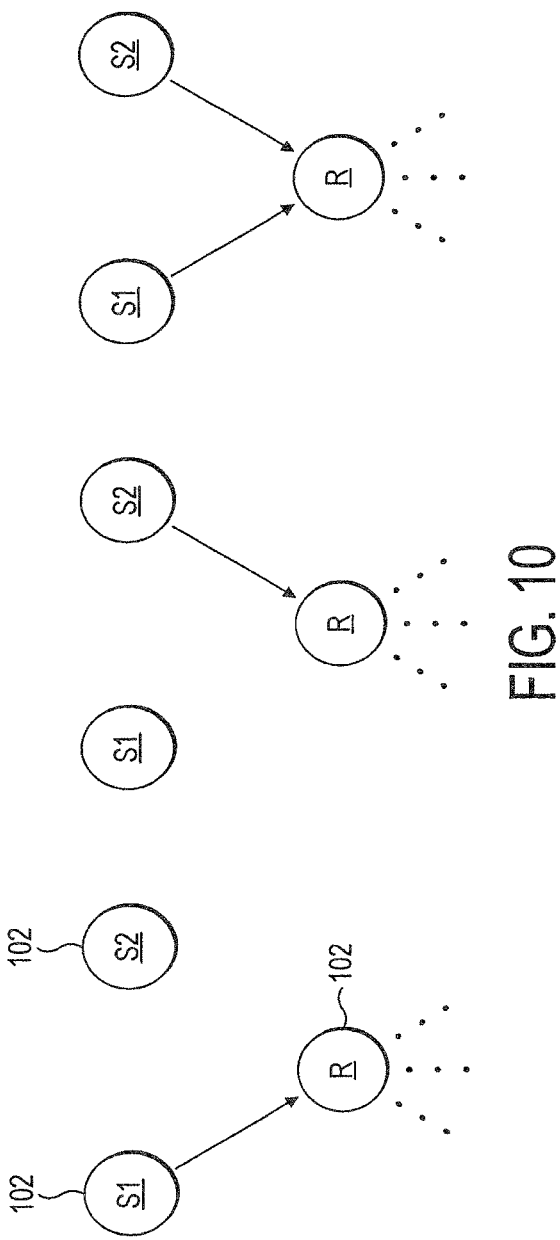
FIG. 10 is a schematic representation of a plurality of further possible routing combinations.

This is illustrated schematically in FIG. 10. Here a relay node 102(R) can establish a connection with either a first source user's node 102(S1) or a second source user's node 102(S2), and receive the stream from the respective source node S1 or S2. The relay R may also have the possibility of establishing separate one-to-one connections with both S1 and S2 and receiving a portion of the stream from each. The optimiser knows that the two sources S1 and S2 have different instances of the same stream because the instances both have the same stream ID. The choice of sources can be used as an option for routing to one or more consuming and/or relaying end-user nodes within one or more a wider routing combinations, and again the optimiser will calculate the utility of each stream as consumed by each end-user node for each possible routing combination and select the combination having the greatest overall utility.

Further, the stream preferably comprises a sub-stream ID 904 which may be appended as a suffix to the stream ID 902. This is used to identify different sub-streams of a stream, which are different instances of the stream corresponding to different quality versions of the same content. For a given stream, the source node may publish that stream in the form of two separate sub-streams which are each independently available and routable from the source node. The sub-streams are identified as having the same content by the stream ID, e.g. the same video call, same TV program, same voice call or same speech or music. In that sense they are different versions of the same stream. However, the different sub-streams of the stream are different quality versions, e.g. a high resolution version and a low resolution version of a video stream, or a high bitrate and low bitrate version of the same audio stream. These different quality versions preferably correspond to different encodings of the same clear (i.e. unencoded) audio or video data. The different versions of the same stream are identified as such by the sub-stream ID 904, which is signalled to the optimiser. Using these stream and sub-stream IDs 902 and 904, the optimisation process can thus include a choice of sub-streams. The choice is based on the utility (i.e. end-user benefit) that would be derived from the consumption of each different sub-stream as routed to each different end-user node of that stream. Note that this is not as straightforward as assuming that the higher quality stream is always better. For example, along certain routes the higher resolution stream may cause greater delay which outweighs the benefit of higher resolution.

The sub-streams may be implemented by means of layered coding. In that case, the lowest quality version of the stream is a base layer encoding of the stream, and one or more increasingly higher quality versions are made up of the base layer plus one or more respective additional layers which when combined with the base layer during decoding improve the quality of the stream.

Preferably the sub-stream selection is included as part of the same utility calculation as the routing optimisation, so that all variables are considered together. In that case, for each of a plurality of possible combinations of routes and sub-streams, the optimiser calculates the utility derived from each sub-stream by each consuming end-user node. The optimiser then calculates the overall utility (over all users and streams) for each of those possible combinations of routes with each possible combination of sub-streams. That is, for a plurality of end-user nodes n=1 ... N, a plurality of streams s=1 ... S which create a plurality of possible combinations v of sub-streams, and a plurality of possible combinations t of routes, then the overall utility for each combination of routes and sub-streams is:

$$U_{tot}\bigg|(t, v) = \sum_{n=1}^{N}\sum_{s=1}^{S} U_n\bigg|(t_{n,s}, v_{n,s})$$

Again, the optimiser then compares the overall utility values for each possible combination t, v and selects the combination having the greatest overall utility, thus representing the greatest benefit for the greatest number of users.

However, alternatively the sub-stream selection may be performed as part of a separate utility calculation for a given combination of routes. This could be the case for example where all substreams follow a fixed route, or the routes have already been decided independently in a previous optimisation phase.

Figure 11:
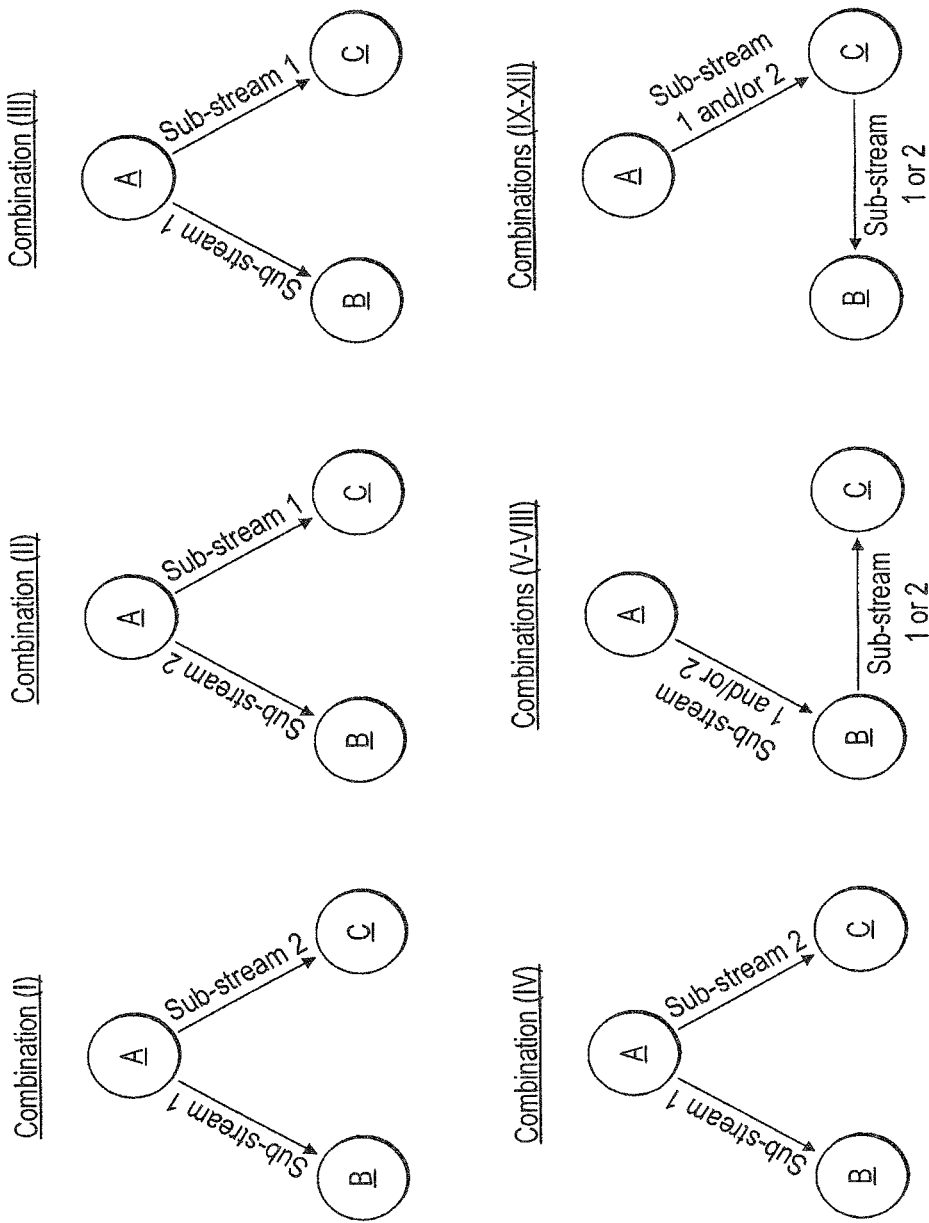
FIG. 11 is a schematic representation of a plurality of possible routing combinations with a plurality of possible sub-stream combinations.

A simplified example of optimising sub-stream selection is illustrated schematically in FIG. 11. Here, Jeremy again wishes to propagate a stream to both James and John, but this time Jeremy is publishing two versions of the same stream: a lower resolution version (sub-stream 1) and a high resolution (sub-stream 2). For the sake of this example it will be assumed that no non-consuming relays are involved.

In the first four possible combinations (I)-(IV), node A establishes separate one-to-one connections with both node B and node C. In combination (I) node A transmits the low resolution sub-stream to directly node B and the high resolution sub-stream directly to node C over the separate connections. In combination (II) node A transmits the low resolution sub-stream directly to node C and the high resolution sub-stream to B over the separate connections. In combination (III) node A transmits the low resolution sub-stream directly to both nodes B and C over the separate connections. In combination (IV) node A transmits the low resolution sub-stream directly to both nodes B and C over the separate connections.

In the next four possible combinations (V) to (VIII) node A establishes a connection only with node B, and node B establishes a connection with node C. In combination (V) node A transmits only the low resolution sub-stream to node B, which consumes it as well as forwarding it on to node C. In combination (VI) node A transmits only the high resolution sub-stream to node B, which consumes it as well as forwarding it on to node C. In combination (VII) node A transmits both the low and high resolution sub-streams to node B, which consumes one and forwards only the low resolution sub-stream on to node C. In combination (VIII) node A transmits both the low and high resolution sub-streams to node B, which consumes one and forwards only the high resolution sub-stream on to node C.

In last four possible combinations (IX) to (XII) node A establishes a connection only with node C, and node C establishes a connection with node B. In combination (IX) node A transmits only the low resolution sub-stream to node C, which consumes it as well as forwarding it on to node B. In combination (X) node A transmits only the high resolution sub-stream to node C, which consumes it as well as forwarding it on to node B. In combination (XI) node A transmits both the low and high resolution sub-streams to node C, which consumes one and forwards only the low resolution sub-stream on to node B. In combination (XII) node A transmits both the low and high resolution sub-streams to node C, which consumes one and forwards only the high resolution sub-stream on to node B.

Each of (I) to (XII) is a different possible combination of routes and sub-streams. For each possible combination (I) to (XII) the optimiser calculates the individual utilities for each of nodes B and C, and then sums those individual utilities to find the overall utility for each combination. The optimiser then compares the overall utility values for the combinations (I) to (XII) and selects the combination with the greatest overall utility.

Alternatively, if for example it is already decided that the route is to be by two separate, direct connections from node A to nodes B and C, then the optimiser could perform a utility calculation based on sub-stream selection alone by only considering possible combinations (I) to (IV).

As mentioned earlier, in addition to the various optimisation techniques discussed above, note that some combinations of routes may ruled out as impossible due to resource constraints. Referring again to FIG. 9, a stream 900 may comprise metadata 906 including at least an indication of one or more minimum and/or desired performance requirements for the stream, such as a minimum bitrate or maximum tolerable delay. Some combinations of routes may involve routes that are incapable of meeting those minimum performance requirements, either because of a limit on the available uplink bandwidth, downlink bandwidth and/or CPU processing resources of an end-user node in the route. Therefore preferably, the metadata will be signalled to the optimiser from one or more of the end-user nodes 102 and, prior to performing the actual utility based optimisation itself, the optimiser will perform a preliminary step of eliminating combinations that do not meet the minimum resource constraints. Note: this works on the "last mile" assumption, which is the assumption that the main limiting constraints are in the end-user nodes 102 rather than in ISPs or Internet backbone. Note also that the preliminary elimination stage need not only rule out combinations that are impossible in an absolute sense, but also those that can be determined up front to be unfeasible solutions.

For example, referring to FIGS. 4 and 5, routing combinations (i) and (ix) could be ruled out in a preliminary stage prior to the optimisation if the available uplink bandwidth of node A is insufficient to transmit two instances of the stream in question.

Alternatively or additionally, the metadata indicating the minimum and/or desired performance requirements could be used by the optimiser. That is, the utility function could be a function of this metadata, so that the benefit is measured relative to the minimum or desired performance requirements of the stream. E.g. the benefit of providing an end-user node with a certain bitrate could be measured relative to the minimum required bitrate for the stream.

In further embodiments, the utility of an end-user node may be dependent on the node itself. Therefore preferably the present invention allows for each end-user node 102 to have its own respective utility function which is potentially different from those of other end-user nodes 102 in the network. To achieve this, preferably each end-user node 102 signals the form of its own utility function to the optimiser, i.e. signals what kind of formula to use. The signalled form of utility function is then used by the optimiser to calculate the individual utility for that node, with each node's utility being calculated according to the respective form. Each end-user node 102 may also signal one or more parameters of the utility function the optimiser, in order to adjust or "fine tune" the utility function for that particular node.

For instance, in a simplified example there could be a choice of two forms of utility function $U_0$ and $U_1$, each having a number of parameters:

$$U_0 = \alpha \frac{\sqrt{\text{bitrate}}}{\text{delay}}$$

$$U_1 = \beta \sqrt{\text{bitrate}} - \gamma \cdot \text{delay}$$

Preferably each node only signals a predetermined index (e.g. 0 or 1) of the desired utility function, and the optimiser comprises a took-up table configured to associate the received index with a corresponding entry in a predetermined list of utility functions. Each node may also signal the relevant parameters $\alpha$ or $\beta$ and $\gamma$, or alternatively some or all of these parameters could be predetermined at the optimiser.

All of the above optimisation features have so far been described in terms of an optimiser able to consider all nodes, as might be implemented centrally at a server 104'. However, in practice when the number of nodes involved becomes large (perhaps above about twenty-five to thirty consuming nodes) then the optimisation problem becomes too complex to be readily solved in such a centralised, "top-down" manner. As the number of nodes and streams grow linearly then the possible routing combinations grow exponentially and analyzing all possible routing combinations quickly becomes unfeasible. In preferred embodiments, this complexity is handled by distributing the optimization exercise to participating nodes and limiting the "visibility" for these nodes, as discussed in more detail below. Furthermore, an exhaustive search of all combinations even within the visibility range may not be desirable due to the complexity. Thus note that it is not necessarily required to consider all possible routing combinations.

As mentioned, the optimiser is preferably implemented in a distributed manner by means of a respective optimiser included in the client application running on each end-user node 102 of the network, with each client's optimiser considering only a subgroup of nodes less than the total number of nodes involved in the steam or streams in question. Once an initial set of connections for the stream or streams has been established, then each connection defines a "hop" between end-user nodes 102 of the network. The subgroup considered by each node's optimiser then comprises the nodes within a predetermined number of hops, or "hop horizon", of that node. Each node only considers the utility of the subgroup comprising the nodes within its own hop horizon when performing its own portion of the optimisation, and in this sense is said to only have "visibility" of the nodes within its own hop horizon. The actual value of the hop horizon could be predetermined or could be changed dynamically from time to time (although remain constant at least for any given utility calculation). This principle will be described in more detail later, but first a suitable client application is described in relation to FIG. 12.

Figure 12:
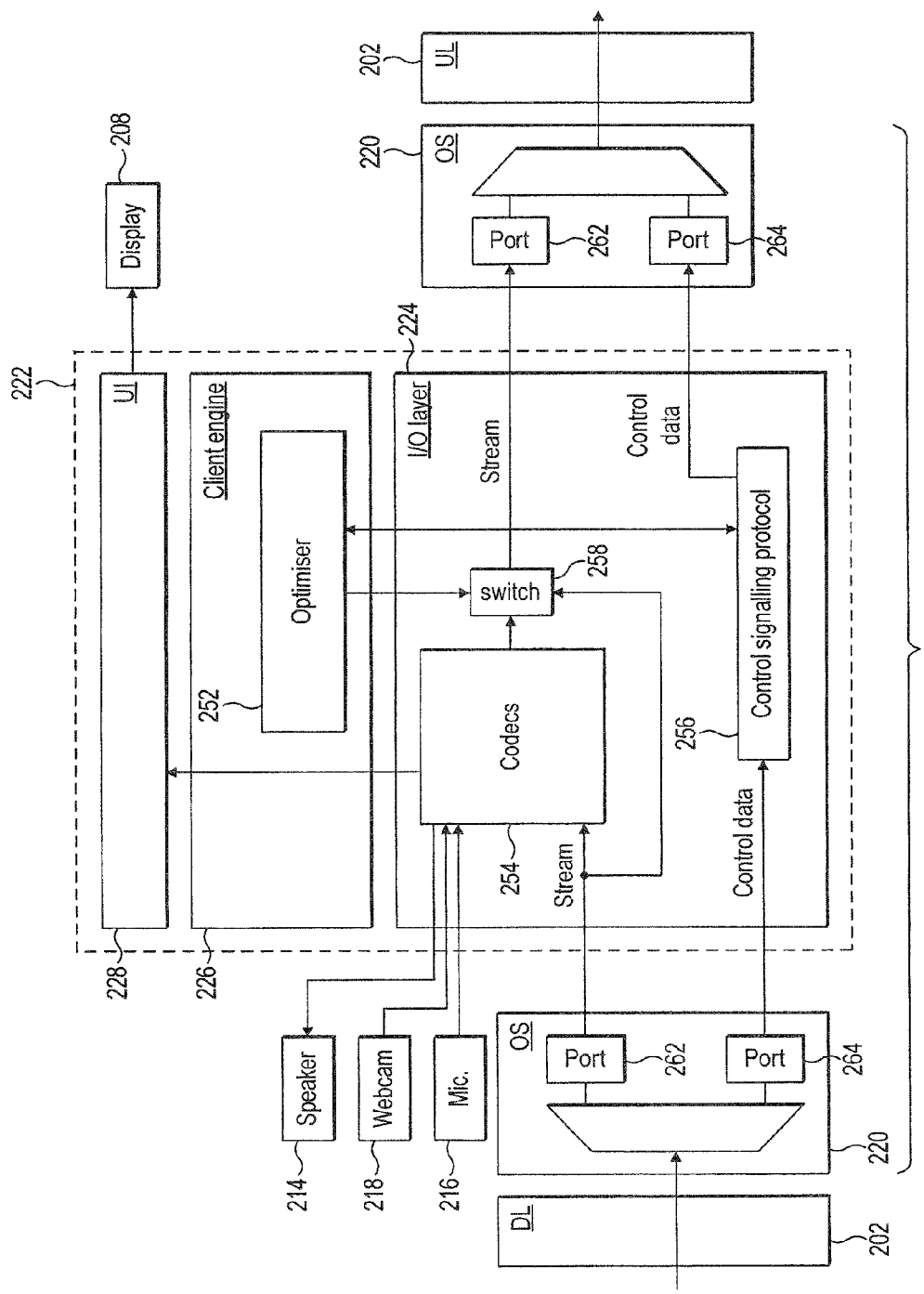
FIG. 12 is a schematic block diagram showing more detail of a client application running on the terminal of FIG. 2.

FIG. 12 is a schematic block diagram showing an operating system (OS) 220 and an example of a client application 222 containing an optimiser 252, both running on a CPU 220 of an end-user node 102. The CPU 200 is connected to the downlink (DL) and uplink (UL) sides of the network interface 202, as well as user input and output devices such as a display 208, speaker 214, microphone 216 and webcam 218.

Amongst various other functions, the operating system 220 is configured to receive incoming traffic from other end-user nodes 102 on the downlink (DL) of the network interface 202, and to de-multiplex the incoming traffic through a plurality of software-implemented ports. These may include a first port 262 for receiving incoming media streams such as voice or video streams, and a second port 264 for receiving control data. The operating system can also multiplex outgoing media streams and control data from the two respective ports 262 and 264 for transmission as outgoing traffic to other end-user nodes 102 on the uplink (UL) of the network interface 202.

The I/O layer 224 of the client application 222 comprises one or more codecs 254 which are arranged to receive the incoming voice and/or video streams, and are configured to decode the voice stream(s) for output to the speaker 214, and/or to decode the video stream(s) for supply to the user interface layer 228 and output to the display 208. The codecs 254 are also arranged to receive clear (i.e. unencoded) voice data from the microphone 216 and/or clear (unencoded) video data from the webcam 218, and are configured to encode the voice and/or video date for output to other nodes 102 via the first port 262 and network interface 202.

The optimiser 252 is implemented at the client engine layer 226. If the optimiser 252 determines that the node on which it is running is to act as a relay (either a pure or consuming relay), it may control the I/O layer 224 to forward received streams on to selected other nodes 102 by means of a software "switch" 258 implemented in the I/O layer 224.

The I/O layer 224 further comprises a control signalling protocol 256 for signalling and receiving control data to and from other end-user nodes 102 of the network. The control signalling protocol is arranged to supply the incoming control data from other nodes 102 to the client engine layer 226, and to supply outgoing control data from the client engine 226 to other nodes 102. This includes supplying utility-related data from other nodes to the optimiser 252, and supplying utility-related data from the optimiser 252 to other nodes 102 of the network.

Each end-user node 102 thus uses the control signalling protocol to signal such utility-related data to the other end-user nodes 102 within its own hop horizon, i.e. other visible end-user nodes. This utility-related data could comprise information about current or proposed routes, such as which other visible nodes a neighbouring visible node is connected to and what stream or stream it receives, or an indication of the fact that a visible node is connected to one or more other invisible nodes. The data could also comprise utility-related variables, such as a neighbouring visible node's measured jitter or loss rate, etc. Further, the optimiser 252 may use the data about the current or proposed routes to estimate certain other utility-related variables, e.g. by assuming a certain fixed delay or loss per hop and multiplying over the number of hops in a route. Each end-user node 102 preferably also signals the preferred form of its own utility function to the others within its hop horizon, and perhaps also some other node-specific parameters of the utility function. By means of this signalling, the optimiser 252 running on each end-user node 102 is thus able to evaluate the individual utilities each other end-user node 102 within its own hop horizon.

Each end-user node 102 preferably also uses the control signalling protocol to signal resource-related data to others within its own hop horizon, e.g. resource variables such as an indication of its available processing resources or uplink or downlink bandwidth. This allows resource constraints to be evaluated before considering utility.

Figure 13A:
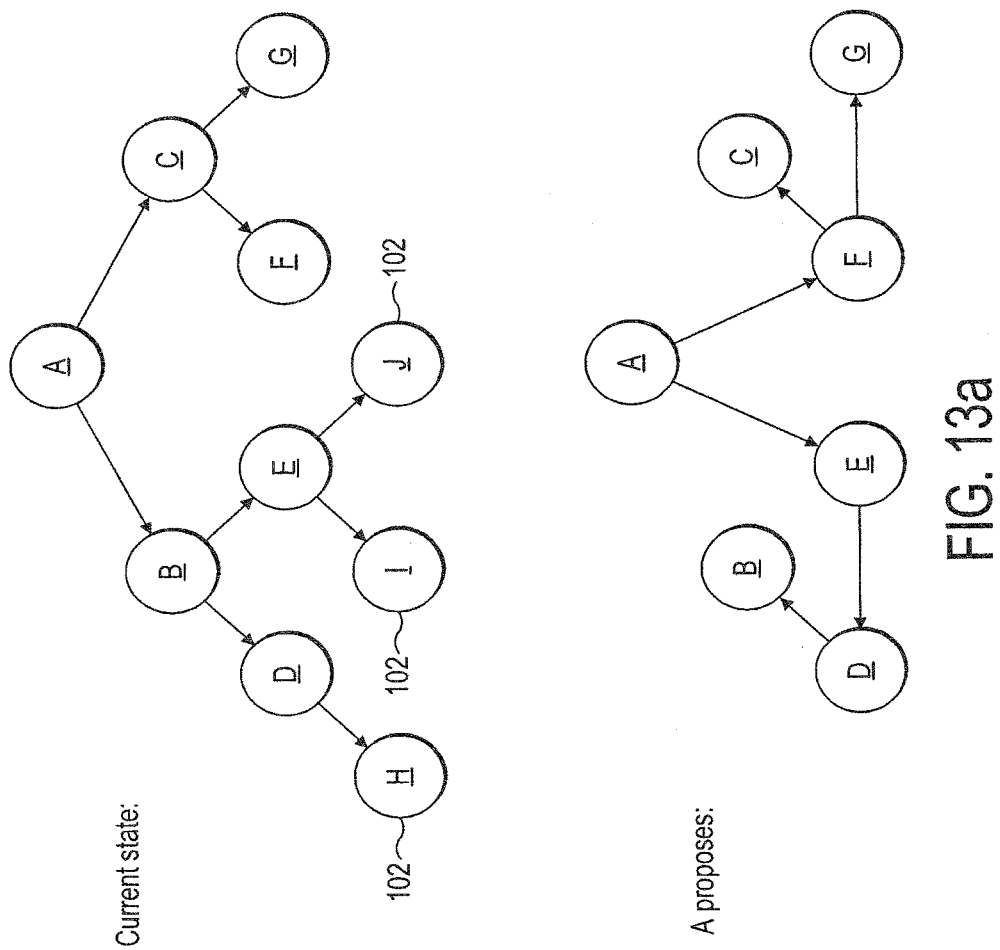
Figure 13C:
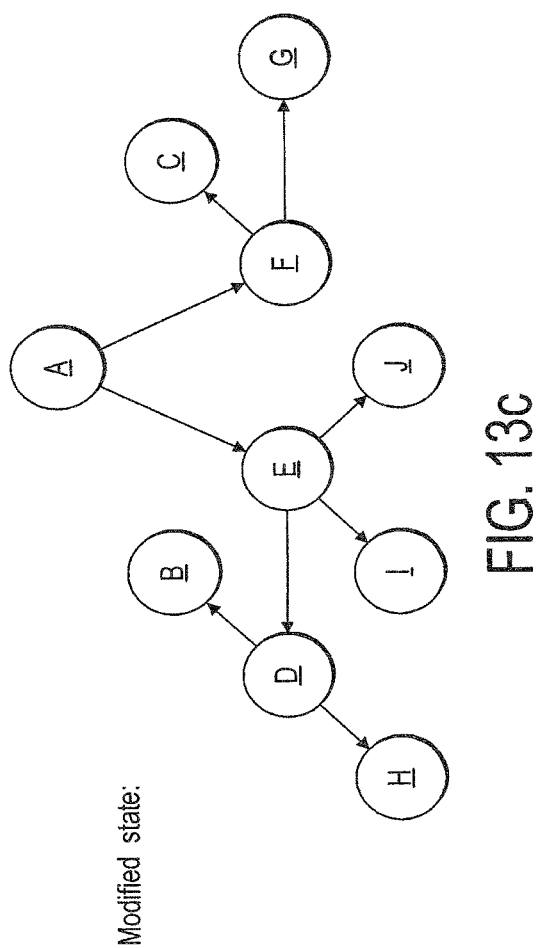

A preferred example of a distributed optimisation algorithm for use in each node's optimiser 252 is now discussed in relation to FIGS. 13a to 13c. These show a group of end-user nodes 102(A) to 102(J) (nodes A . . . J for brevity), amongst which a stream is to be propagated. For illustrative purposes, it will be assumed that there is only one source of the stream, A; and that each of the other nodes B . . . J are consumers of the stream. It will also be assumed that no firewalls block any potential connections between any of the nodes A . . . J.

Each end-user node 102 is running a respective instance of a client application 222 each including a respective instance of a distributed optimiser 252. As mentioned above, the optimiser 252 running on each node 102 only considers the sub-group comprising the other nodes within a specific number of "hops" (i.e. a specific number of connections) of its own node. However, in order to first have the concept of a number of hops, an initial set of connections must be established. In one embodiment, this is done by each node connecting to another random node involved in the stream as and when it joins the stream (the nodes will always connect in some order, even if only a few milliseconds apart). For example, B first establishes a connection with A; then C establishes a connection at random with A (out of a choice of A and B); then D establishes a connection at random with B (out of a choice of A, B and C); etc. In the example of FIG. 13a, this random process continues such that E establishes a connection with B; F establishes a connection with C; G establishes a connection with C; H establishes a connection with D; I establishes a connection with E; and J establishes a connection with E; but it will be understood that any other set of connections could have resulted.

In the example of FIG. 13a, the initial routes created by the initial set of connections are as follows:

Route to B: A→B
Route to C: A→C
Route to D: A→B→D
Route to E: A→B→E
Route to F: A→C→F
Route to G: A→C→G
Route to H: A→B→D→H
Route to I: A→B→E→I
Route to J: A→B→E→J Once each of all the nodes currently involved in the stream has established a connection to another such node, the concept of a hop is then defined: a hop corresponds to the route of a stream across a single connection between two end-user nodes. The optimiser 252 running on each node then only has visibility of the other nodes within a specific number of hops, which may be referred to as its "hop horizon". In a preferred embodiment, the hop horizon of each optimiser is three hops, which the inventors have found through simulation to provide a well optimised set of connections in terms of the end-user benefit across all nodes but whilst still being feasible in terms of computational complexity. However, for illustrative purposes, the hop horizon in the following example will be taken to be two hops, which is also effective as a reasonable working value.

Referring to FIG. 13a, in the case of a two hop limit, the optimiser 252 running on node A has visibility of nodes B, C, D, E, F and G. This means the optimiser 252 receives utility-related data from the other optimisers 252 running on those nodes. For example, the optimiser 252 may receive utility related information about what other visible nodes each visible node is connected to, and it may use this information to estimate utility-related variables such as a delay or loss rate for a particular route amongst the visible nodes. Further, the optimiser 252 receives any indications from each visible node of the respective form of the utility function to use for each visible node, and any specified parameters of the utility function.

Preferably, the optimiser also receives "aggregate" information about other non-visible nodes beyond the hop horizon, this being an indication of the fact that a visible node at the hop horizon is connected to other non-visible nodes beyond the hop horizon.

So in the illustrated example, the optimiser 252 running on node A knows the current set of connections amongst nodes B, C, D, E, F and G and the routes of the stream thereover; is able to evaluate the individual utilities of each of nodes B, C, D, E, F and G; and furthermore is aware of the fact that nodes D and E are connected to other non-visible nodes.

Similarly, each of the optimisers 252 running on the other end-user nodes has visibility of a respective sub-group, as follows.

| Node: | Visibility: | Aggregate information: |
| --- | --- | --- |
| A | B, C, D, E, F, G | D and E connect elsewhere |
| B | A, C, D, E, H, I, J | C connects elsewhere |
| C | A, B, F, G | B connects elsewhere |
| D | A, B, E, H | A and E connect elsewhere |
| E | A, B, D, I, J | A and D connect elsewhere |
| F | A, C, G | A connects elsewhere |
| G | A, C, F | A connects elsewhere |
| H | B, D | B connects elsewhere |
| I | B, E, J | B connects elsewhere |
| J | B, E, I | B connects elsewhere |

Given this visibility, the optimiser 252 on each node 102 runs an optimisation algorithm to try to find an optimum route amongst the nodes of its own respective visible sub-group, according to a routing criterion evaluated only with respect to its own visible sub-group (including itself). Preferably the routing criterion is the utility based calculation described above. That is, the optimiser 252 on each node 102 only evaluates the individual utilities of each consuming node in the visible sub-group (including itself if it is a consumer), combines these utilities to determine the overall utility of only the visible sub-group, and then considers how the overall utility changes over a plurality of different possible combinations of routes amongst only the nodes of the visible sub-group. The combination having the greatest overall utility is determined to be the preferred combinations, at least within that sub-group of visible nodes. However, a distributed optimisation could alternatively use other routing criteria.

The optimisation process is preferably dynamic, such that each optimiser 252 runs throughout the lifetime of the stream (i.e. throughout the time for which it is transmitted) and performs repeated optimisation calculations during that time. The results of each calculation need not always be the same due to changing conditions. So whilst one combination of routes may be preferred by a particular optimiser 252 at one time, if conditions change then another combination of routes may be preferred at another time. At each repeated optimisation calculation, the optimiser 252 looks at the current set of connections forming the current combination of routes within its visible sub-group, and considers whether a different combination would improve the overall utility of that sub-group.

So for example, say that the current combination of routes is as shown at the top of FIG. 13*a*, either because that is how the initial connections were established or because under previous conditions this was found by the optimiser to be preferred. The optimiser 252 on node A evaluates the utility of each of nodes A, B, C, D, E, F and G; then combines them to determine the overall utility of this combination. The optimiser on node A then considers a plurality of other possible combinations, and for each of these again evaluates the utility of each of nodes A, B, C, D, E, F and G then combines them to determine the overall utility of this potential combination. In the example shown at the bottom of FIG. 13*a*, node A's optimiser thus determines that a different combination of routes within its own sub-group would have a greater overall utility than the current combination, and so would represent the greatest benefit to the greatest number of users, at least within the visibility of that sub-group. The difference between this combination and the current combination amounts to a proposed modification to the routes amongst the visible sub-group.

Preferably however, the optimiser on any given end-user node should not make changes autonomously, because it cannot see how the proposed modification would affect other non-visible end-user nodes outside of its own sub-group, i.e. beyond its hop horizon.

Therefore the optimiser preferably uses the aggregate information to determine whether its proposed modification would affect any other non-visible nodes. It then communicates with the optimisers 252 on other end-user nodes that do have visibility of the affected nodes to seek their agreement or disagreement to the proposed modification.

For instance, in the example shown at the bottom of FIG. 13*a*, the optimiser 252 running on node A has determined based on its own visibility that routing would be improved if: A establishes connections with E and F, E establishes a connection with D, D establishes a connection with B, and F establishes connections with C and G. That is, such that the routes within A's visible subgroup would be as follows.
Route to E: A→E
Route to D: A→E→D
Route to B: A→E→D→B
Route to F: A→F
Route to C: A→F→C
Route to G: A→F→G However, A also knows from the aggregate information that both D and E both connect onwards to further, non-visible nodes (H, I and J), although A itself does not know anything else about those non-visible nodes. Therefore the optimiser 252 running on A communicates details of its proposed modification to the optimiser 252 running on other nodes that do have the required visibility. Preferably node A communicates its proposed modification to all other affected nodes. These other nodes then compare the overall utility of the current combination of routes against the overall utility if the modification was implemented, each within their own respective sub-group of visible nodes. If the overall utility within such another node's own visible sub-group is equal or improved under the proposed modification, then it responds back to the proposing node (e.g. A) with agreement. Otherwise, if the overall utility within the other node's own visible sub-group is in fact reduced under the proposed modification, then it responds with disagreement (or disagreement could be implicit in a lack of response, e.g. based on a timeout).

For example, A communicates details of its proposed modification to D and E. As illustrated at the top of FIG. 13*b*, the optimiser 252 running on node D currently has visibility of nodes A, B, E and H, and evaluates the overall utility for this sub-group (including itself if it is a consumer). In order to compare the proposed modification against the current situation, the optimiser on node D is then preferably given temporary visibility of any nodes that would be newly within the hop horizon (two hops in this example) under the proposed modification, i.e. if the proposed modification was implemented. In this case, D additionally gains visibility of nodes I and J, which would be within two hops if D connected directly to E. Thus under the proposed modification the optimiser 252 running on node D would have visibility of nodes A, B, E, H, I and J and so evaluates the overall utility for this sub-group (again including itself if it is a consumer). The optimiser 252 on node D then compares the overall utility of the consuming nodes within its own visible sub-group given the current routes versus the overall utility of the consuming nodes that would be within its own visible sub-group under the proposed modification, and determines which is greater. If the new overall utility of the sub-group would be equal or greater than the current value, the optimiser 252 on node D signals agreement to the optimiser 252 on node A. Otherwise it signals disagreement (or disagreement is indicated implicitly by a timeout). For instance, the utility could depend on whether the route to H via E and D introduces too much loss or delay.

However, agreement is also required for example from node E. As illustrated at the bottom of FIG. 13*b*, the optimiser 252 running on node E currently has visibility of nodes A, B, D, I and J, and evaluates the overall utility for this sub-group (including itself if it is a consumer). In order to compare the proposed modification against the current situation, the optimiser on node E is then preferably given temporary visibility of node H, which would be within two hops if D connected directly to E. Thus under the proposed modification the optimiser 252 running on node E would have visibility of nodes A, B, D, H, I and J and so evaluates the overall utility for this sub-group (again including itself if it is a consumer). The optimiser 252 on node E then compares the overall utility of the consuming nodes within its own visible sub-group given the current routes versus the overall utility of the consuming nodes that would be within its own visible sub-group under the proposed modification, and determines which is greater. If the new overall utility of the sub-group would be equal or greater than the current value, the optimiser 252 on node E signals agreement to the optimiser 252 on node A. Otherwise it signals disagreement (or times out).

The proposing node (e.g. A) may require similar agreement from the optimisers 252 running on all other end-user nodes 102 affected by the proposed modification, in this example from all of nodes B, C, D, E, F, G, H, I and J. However, in order to reduce calculation time and/or increase the chance of a modification being accepted, in a preferred embodiment the proposing node may only require agreement from all other end-user nodes 102 that are both affected by the proposed modification and which relay the stream on to other end-user nodes, in this example only C, D and E; or may only require agreement from all other end-user nodes 102 that are both affected by the proposed modification and which connect to other end-user nodes not visible from the proposing node, in this example only D and E.

Once (and if) all the required agreements are received, the optimiser 252 running on node A communicates the fact to all other affected end-user nodes, in this example all of nodes B, C, D, E, F, G, H, I and J. The optimisers on each of the affected end-user nodes then implement the modification by dropping any old connections and establishing any new connections required by the modification, thus updating the set of connections and so modifying one or more of the routes between end-user nodes 102. Alternatively the modification could be implemented on condition of receiving a certain number of agreements, or a certain proportion of agreements to disagreements.

In the example of FIG. 13c, the modified routes created by the updated set of connections are as follows:
Route to B: A→E→D→B
Route to C: A→F→C
Route to D: A→E→D
Route to E: A→E
Route to F: A→F
Route to G: A→F→G
Route to H: A→E→D→H
Route to I: A→E→I
Route to J: A→E→J In large networks, potentially chains of agreement could be required. E.g. if node H connected onwards by two or more hops away from D, then the optimiser 252 on node D would know of the existence of such onward connections from the aggregate information but would still not have visibility of the furthest nodes. Therefore the optimiser on D would have to gather further agreement from nodes such as H, again by means of a similar optimisation algorithm running on node H, and pass that agreement or disagreement back to A (assuming still by way of example that A is the proposing node). However, such chains need not be required. In a simpler embodiment each node proposes only changes that affect it's own visibility range, and would preserve the streams that cross the visibility range boundary so that the total utility does not decrease (perhaps "naively" prohibiting decreasing the transport quality of any stream going outside of the visibility range). Another "naïve" solution would be to consider the sender or receiver at the border as a single consumer or source of the stream (not a correct assumption, but potentially close enough for a working system).

The newly modified combination of routes is shown in FIG. 13c (assuming the required agreement from at least nodes D and E).

Note that the optimisation algorithms running on all the end-user nodes 102 are each always continuously looking for potential modifications that may optimise a part of the network, and the responsibility for proposing modifications is not limited to the optimiser running any one node such as the source node A. This is an ongoing process, such that different parts of the network are continually changing, and modifications originating from one node may then have a knock-on effect inducing other nodes' optimisers to find further modifications. Each modification is a phase in the overall optimisation process, tending towards an optimal solution.

Further, note that as mentioned, the optimiser on a given node need not necessarily consider all possible combinations, even only within its own visibility range. Instead, each may perform a local optimization, e.g. by means of a heuristic algorithm. Preferably the heuristic algorithm is a genetic algorithm. Thus, each node first searched for a solution (routing combination) on its own based on its knowledge of the network, before these solutions go and compete out on the real network by seeking agreement with other nodes for the proposed changes.

In order to improve the chance that modifications are accepted by other nodes, in particularly preferred embodiments the proposed modifications are broken down into separately considerable parts.

This may involve dividing the proposed modification into independent parts, and returning agreement or disagreement from nodes separately with respect to each independent part. For example, referring to the example shown at the bottom of FIG. 13a, the modification to the routes amongst nodes A, B, D and E may be considered as an independent part of the proposal from the modification to the routes amongst nodes A, C, F and G. This is because the overall utility of nodes A, B, D and E is unaffected by what happens amongst nodes A, C, F and G, and vice-versa. That is, whether or not the modification amongst nodes A, B, D and E is accepted does not affect the overall utility of nodes A, C, F and G; and whether or not the modification amongst nodes A, C, F and G is accepted does not affect the overall utility of nodes A, B, D and E. So the re-routing of the stream from the combination of routes A→B→D,E to the combination A→E→B,D is independent of the re-routing of the same stream from the combination A→C→F,G to the combination A→F→C,G. The two independent parts of the solution can be considered separately. When the proposing node (e.g. A) communicates its proposed modification to other affected end-user nodes (e.g. B or C), the optimiser running on each calculates the overall utility of each part separately, then signals back a separate agreement or disagreement for each part. When all the responses are received back, only the parts of the modification to which all affected nodes agreed will be implemented.

Further, it may be possible to divide a proposed modification into successive stages, such that an earlier (preceding) stage of the proposed modification can be implemented without necessarily having to also implement an onward (succeeding) stage of the proposed modification (this is not the same as independent parts because the succeeding stage is not independent of its preceding stage). An example of this is illustrated schematically in FIG. 14. At the top of FIG. 14, in the initial set of connections: A establishes a connection with B, B establishes connections with D and E, E establishes a connection with I and J, and I establishes a connection with another end-user node 102(K). The routes created are as follows.
Route to B: A→B
Route to D: A→B→D
Route to E: A→B→E
Route to I: A→B→E→I
Route to J: A→B→E→J
Route to K: A→B→E→I→K Also, for the example of FIG. 14, a three hop horizon for each optimiser will be assumed, i.e. a visibility within a three hop limit (instead of two as in FIG. 13). Say then that the optimiser running on node A proposes a modification as shown as the bottom of FIG. 14. That is, A establishes a connection to E, E establishes a connection with D and J, D establishes a connection with B, and J establishes a connection with I. The proposed modifications to the routes within A's visible sub-group are thus as follows.
Route to E: A→E
Route to D: A→E→D
Route to B: A→E→D→B
Route to J: A→E→J
Route to I: A→E→J→I Node K is beyond the hop horizon of A (beyond three hops), and so the optimiser 252 running on A must seek the agreement for its proposed modification from the optimiser 252 running on K. In a situation like this, the modification proposed amongst nodes E, I and J can be considered by K's optimiser 252 as a successive stage following the modification proposed amongst nodes A, B, D and E. That is, the modification proposed amongst nodes A, B, D and E can be considered separately before the modification proposed amongst nodes E, I and J. If the modification amongst nodes A, B, D and E is accepted, it is not necessary to accept the modification amongst nodes E, I and J. So it is possible to consider accepting the re-routing of the combination of routes A→B→,D,E to the combination A→E→D→B; and then, if accepted, subsequently consider whether or not to accept the re-routing of the combination E→I→J to the combination E→J→I. Generally where there is a proposed modification that can be broken down into stages, the optimiser running on the proposing node (e.g. A) communicates the proposed modification to all other affected end-user nodes, and the optimiser running on each calculates the overall utility of each stage separately, then signals back a separate agreement or disagreement for each stage. When all the responses are received back, only the stage of the modification to which all affected nodes agreed will be implemented.

A preferred optimiser algorithm to run at each end-user node 102 is as follows.

(1) When a proposing node finds a better routing solution than the status quo, it assembles a list of proposed modifications to be made (connections to be added and removed for each stream). If the proposing node itself is not among the affected senders, the modifications are sent to one of the affected senders and it is not processed further.

(2) When a proposing node finds a better solution than the status quo, and it is itself among the affected senders, it checks whether there are parts of the modification that would only require a change to sending connections immediately connecting from that proposing node. If so, it puts those parts into effect immediately, and sends the rest of the parts of the modification (if any) to one of the affected senders and does not process them further. But a node should only put those parts into effect if the resulting intermediate solution is also an improvement.

(3) Divide the modifications into independent parts or successive stages, such that each successive stage does not degrade overall utility. Not all modifications can necessarily be divided like this, but many may.

(4) Ask the opinion of all affected senders (except the proposing node itself). This is done by sending them the modifications (divided into parts or stages). Each of them will then:

(4a) Respond with the maximum number of these parts or stages (starting from the first) that either can be performed without degrading overall utility (based on their knowledge of the network), or for which the node is not among the affected senders. Two versions of this number are calculated:

(4a)(i) Comparing the proposal to the status quo structure.

(4a)(ii) Comparing the proposal to the status quo structure plus any modifications that the node has already agreed to within the last 60 seconds (for example), but that have not yet been put into effect. Each node therefore keeps a list of modifications it has recently agreed to.

(4b) Check whether some of the parts or stages of the modification that the node did not agree to would require it to establish new connections. If so, it nonetheless establishes such connections if some additional conditions are met, e.g. if it's current number of connections is less than four and a target consuming node is further than two hops from it. This improves behaviour when disagreement was caused by lack of visibility to distant parts of the network.

(5) When all responses are in at the proposing node, send each other node a message with the maximum number of parts or stages that everyone agreed to. They will then put the modification into effect (unless it did not appear in their recent agreed modifications list, in which case they ignore it as a security safeguard).

There are some cases when some of the affected senders disagree with the modification. Reducing these cases is the purpose of dividing modifications into successive stages or independent parts—then, even though a node may disagree with the whole modification, it may still often agree with at least the first stage or one part. This means the network can still evolve, although more slowly than it would otherwise. For example, simulation shows that without dividing into stages, 20% of modifications are rejected by at least one affected sender; but when dividing into stages, only 6% are completely rejected (i.e. some affected sender responded that zero affected stages are acceptable) and an additional 9% are partially rejected (i.e. some but not all stages are acceptable).

The above has been described in terms of "transport hops", i.e. connections that actually transport streams. In embodiments, it may not be preferable to consider the horizon exclusively in terms of hops of the transport routes. Consider the case where no set of routes has been established yet, and therefore there is no transport; but the optimizer(s) need to come up with an initial solution in order to gather data. Also, there are cases where the optimizers need to gain visibility to some nodes but not transmit any streams with them. Therefore additional connections may be created, which can be thought of as "empty" or "dummy" connections or hops. Further, there may be cases where it would be desirable not to have visibility of some nodes that based on transport hops would otherwise fall into the visibility range. Therefore, in embodiments, transport hops and visibility hops may be considered as separate types of connection. The set of visibility hops is similar to the set of transport hops within the hop-horizon, but may comprise additional dummy hops, and may have some of the otherwise visible transport hops removed.

It will be appreciated that the above embodiments are described only by way of example. For instance, although the above has been described mainly in terms of a peer-to-peer (P2P) network, the present invention may be applied to any network of end-user nodes in which streams can be routed via end-user nodes acting as a relay. Further, other forms of utility function are possible; and the utility function may be a function of other factors, e.g. of the geographical proximity of nodes in a route, which will affect delay. Further, any or all of the different types of combinations discussed above may be considered together by the optimiser in wider possible routing combinations, including the use of consuming and non-consuming relay nodes, transmitting over multiple connections from a given relay node, dividing a stream into portions along parallel routes from a source or relay node, separate routing of related audio and video streams, choice of source node, and/or choice of sub-streams. Further, in addition to optimising for end-user nodes 102, the optimisation may additionally take into account the utility of one or more other network elements in the utility calculation, such as gateways 106 to other networks. Further, the source of a stream may be a server rather than an end-user node. In further aspects of the invention, one or more relays of a stream may be servers.

Furthermore, other implementations of a distributed optimiser are possible. For instance, other criteria for routing can be used in a distributed optimiser than the utility functions. Further, the optimiser on each node need not necessarily evaluate its routing criterion only with respect to end-user nodes that share information with it nor use such information received from those end-user nodes when evaluating its routing criterion, but could instead for example use stored or predetermined information or information received from some other controlling node. Also, if the group of end-user nodes to be considered is small enough or if optimising nodes have enough processing resources, then it may not be necessary for the optimiser on each node to consider only a sub-group but instead they may have visibility of all relevant nodes. Further, in the above it has been described that nodes connect to random other nodes when establishing the initial set of connections. However, in alternative embodiments the initial set of connections could be established according to some predetermined rule. Further, when returning agreement from other affected end-user nodes, one of such affected nodes could agree to a proposed modification if the utility within its own visible sub-group is being reduced below a threshold (rather than only agreeing if the utility is equal or greater). Further, in some embodiments it could be allowed for individual optimisers to make autonomous modifications within their own visible sub-group, without seeking agreement from the optimisers running on other nodes. Further, although the above has been described in terms of a dynamic optimisation, in alternative embodiments a re-optimisation calculation could be triggered by events such as a node joining a stream or a change in resource usage at a node.

Other applications and configurations may be apparent to the person skilled in the art given the disclosure herein. The scope of the invention is not limited by the described embodiments, but only by the appended claims.

In accordance with one aspect of the invention there may be provided a program product which comprising code which when executed on an optimising node of the network will operate in conjunction with like programs executed on other optimising nodes of the network to perform any of the method steps described herein.

In accordance with another aspect of the invention there is provided a communication system wherein the optimising nodes may be configured in accordance with any of the methods of the invention described herein.

The invention claimed is:

1. A method of routing a data stream among a plurality of network nodes including at least a plurality of end-user nodes, the method comprising:
    obtaining the data stream at an optimising node included in routes established for said data stream to a plurality of consuming end-user nodes formed by connections amongst a group of end-user nodes;
    executing an optimisation algorithm at the optimizing node to determine routing modifications with respect to a sub-group of the group of end-user nodes by:
    evaluating a routing criterion with respect to a collection of end-user nodes within a respective said sub-group which share information with the optimising node, the routing criterion based upon an overall utility value that quantitatively estimates end-user benefit derived from consumption of the stream by the plurality of end-user nodes;
    applying one or more routing modifications to modify the routes based on the evaluation of the routing criterion with respect to the sub-group; and
    transmitting the data stream to the consuming end-user nodes via the routes as modified.

2. The method as recited in claim 1, wherein the data stream comprises at least one of an audio stream or a video stream.

3. The method as recited in claim 1, wherein the data stream comprises at video call.

4. A method as recited in claim 1, wherein the data stream comprises at voice call.

5. A method as recited in claim 1, wherein the optimising node comprises a relay node included in one of said routes between a source of the data stream and at least one of the plurality of consuming end-user nodes.

6. A method as recited in claim 1, wherein the optimising node comprises one of the plurality of consuming end-user nodes.

7. A method as recited in claim 1, wherein the optimising node comprises a source of the data stream.

8. A method as recited in claim 1, wherein said overall utility value is computed as a combination of factors that affect utility including one or more of stream properties, transport properties, or consumption properties.

9. A method as recited in claim 1, wherein evaluating the routing criterion comprises:
    determining changes in the routing criterion with respect to the collection of end-user nodes within the sub-group for potential routing modifications; and
    selecting at least one of the potential routing modifications as preferred based on the determined changes.

10. A method as recited in claim 1, wherein evaluating routing criterion comprises computing utility values for multiple potential routes based on utility values assigned to end-user nodes in the multiple potential routes.

11. A method of routing a data stream among a plurality of nodes in a peer-to-peer network, the method comprising:
    ascertaining a plurality of potential routes for communication of the data stream to one or more endpoints through the plurality of nodes;
    selecting a routing for the data stream using the plurality of potential routes by evaluating routing criterion with respect to a sub-group of said plurality of nodes within a designated number of connections between a source of the data stream and the one or more endpoints, including:
    computing utility values for each of the plurality of potential routes using a combination of factors that affect utility including one or more of stream properties, transport properties, or consumption properties; and
    deriving scores to quantify end-user benefit for each of the plurality of potential routes based on the utility values; and
    causing communication of at least a portion of the data stream to the one or more endpoints nodes via the selected routing.

12. A method as recited in claim 11, wherein:
    the data stream contains both an audio stream and video stream; and
    selecting the routing comprises selecting different routes for the audio stream and the video stream.

13. A method as recited in claim 11, wherein the plurality of potential routes includes at least one route through one or more relaying nodes.

14. A method as recited in claim 11, wherein the plurality of potential routes includes routes originating from multiple different sources available for the data stream.

15. A method as recited in claim 11, wherein selecting a routing comprises:
    communicating a routing proposal to recipient nodes of the plurality of nodes in the peer-to-peer network based on the evaluating; and
    obtaining feedback from the recipient nodes regarding the proposal, the selected routing determined at least in part based on the feedback that is obtained.

16. A computing device configured to operate as a node in a peer-to-peer network comprising:
    a processing unit;

a storage device storing a client application that, when executed via the processing unit, performs operations for routing a data stream among a plurality of nodes in the peer-to-peer network including:
  ascertaining a plurality of potential routes for communication of the data stream to one or more endpoints through the plurality of nodes;
  selecting one or more routes from the plurality of potential routes by evaluating routing criterion with respect to a sub-group of said plurality of nodes within a designated number of connections between the computing device and the one or more endpoints, including: computing utility values for the plurality of potential routes based on one or more of stream properties, transport properties, or consumption properties that affect utility; and scoring the plurality of potential routes based on the utility values to quantify end-user benefit derived from consumption of the data stream; and
  routing the data stream to the one or more endpoints nodes via the one or more selected routes.

17. A computing device as recited in claim 16, wherein
  the data stream contains both an audio stream and video stream; and
  selecting the one or more routes comprises selecting different routes for the audio stream and the video stream.

18. A computing device as recited in claim 16, wherein evaluating the routing criterion further comprises ruling out one or more possible routes due to resource constraints prior to computing the utility values.

19. A computing device as recited in claim 16, wherein the plurality of potential routes includes routes originating from multiple different sources available for the data stream.

20. A computing device as recited in claim 16, wherein selecting a routing comprises:
  communicating a routing proposal to other nodes of the plurality of nodes in the peer-to-peer network based on the evaluating; and
  obtaining feedback from the other nodes regarding the proposal, the one or more selected routes determined at least in part based on the feedback that is obtained.

* * * * *